(12) United States Patent
Seo et al.

(10) Patent No.: US 9,918,122 B2
(45) Date of Patent: Mar. 13, 2018

(54) DISPLAY APPARATUS AND CONTROL METHOD THEREOF

(71) Applicant: SAMSUNG ELECTRONICS CO., LTD., Suwon-si, Gyeonggi-do (KR)

(72) Inventors: Da-som Seo, Yongin-si (KR); Sang-mook Lim, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 15/341,656

(22) Filed: Nov. 2, 2016

(65) Prior Publication Data

US 2017/0134797 A1    May 11, 2017

(30) Foreign Application Priority Data

Nov. 6, 2015   (KR) .................. 10-2015-0155580

(51) Int. Cl.
| | |
|---|---|
| H04N 7/16 | (2011.01) |
| H04N 21/438 | (2011.01) |
| H04N 21/426 | (2011.01) |
| H04N 21/61 | (2011.01) |
| H04N 21/462 | (2011.01) |
| H04N 21/63 | (2011.01) |

(52) U.S. Cl.
CPC ... H04N 21/4383 (2013.01); H04N 21/42638 (2013.01); H04N 21/4384 (2013.01); H04N 21/4622 (2013.01); H04N 21/6125 (2013.01); H04N 21/631 (2013.01)

(58) Field of Classification Search
CPC .......... H04N 21/4383; H04N 21/6125; H04N 21/42638; H04N 21/4384; H04N 21/4622; H04N 21/631
See application file for complete search history.

(56) References Cited

U.S. PATENT DOCUMENTS

| 6,317,168 B1 | 11/2001 | Seo |
| 2005/0066374 A1 | 3/2005 | Nagamura et al. |

(Continued)

FOREIGN PATENT DOCUMENTS

| KR | 10-2006-0125265 | 12/2006 |
| KR | 10-0768814 | 10/2007 |

(Continued)

OTHER PUBLICATIONS

International Search Report dated Feb. 21, 2017 from International Patent Application No. PCT/KR2016/012605, 3 pages.

Primary Examiner — John Schnurr
(74) Attorney, Agent, or Firm — Staas & Halsey LLP

(57) ABSTRACT

A display apparatus includes a display configured to display an image based on at least one between received first and second broadcast signals, a first signal processor configured to selectively activate and inactivate an operation for processing the first broadcast signal, a second signal processor configured to selectively activate and inactivate an operation for processing the second broadcast signal, and a controller configured to control the first signal processor and the second signal processor to selectively activate or inactivate the operations for processing the first broadcast signal and the second broadcast signal in response to a command for switching between the first broadcast signal and the second broadcast signal.

17 Claims, 23 Drawing Sheets

(56) References Cited

U.S. PATENT DOCUMENTS

2007/0133692 A1\* 6/2007 Reddy .................... H04N 19/61
                                                    375/240.25
2012/0324510 A1\* 12/2012 Leley ................ H04N 21/4333
                                                        725/50

FOREIGN PATENT DOCUMENTS

| KR | 10-2009-0010946 | 1/2009 |
| KR | 10-0896435 | 5/2009 |
| KR | 10-2009-0066043 | 6/2009 |
| KR | 10-1476193 | 12/2014 |

\* cited by examiner

FIG. 15

| SORT | SEQUENCE | RESORUCES |
|---|---|---|
| DTV | 1 | DTV DECODER |
|  | 2 | DEMUX |
|  | ⋮ | ⋮ |

310

DISPLAY APPARATUS AND CONTROL METHOD THEREOF

CROSS-REFERENCE TO RELATED APPLICATIONS

This application claims the priority benefit of Korean Patent Application No. 10-2015-0155580 filed on Nov. 6, 2015, in the Korean Intellectual Property Office, the disclosure of which is incorporated herein by reference in its entirety.

BACKGROUND

1. Field

Apparatuses and methods with respect to the exemplary embodiments disclosed herein relate to a display apparatus capable of displaying an image of a certain channel by receiving and processing an analog video signal and a digital video signal and a control method thereof, and more particularly to a display apparatus having an improved structure for quickly displaying an image of a switched channel when a channel is switched between an analog video signal and a digital video signal and a control method thereof.

2. Description of the Related Art

To compute and process predetermined information in accordance with certain processes, an electronic apparatus basically includes a central processing unit (CPU), a chipset, a memory, and the like electronic components for computation. Such an electronic apparatus may be classified variously in accordance with what information will be processed therein. For example, the electronic apparatus is classified into an information processing apparatus such as a personal computer, a server or the like for processing general information, and an image processing apparatus for processing image information.

The image processing apparatus processes an image signal or image data received from the exterior in accordance with various image processing processes. The image processing apparatus may display an image based on the processed image data on its own display panel, or output the processed image data to another display apparatus provided with a panel so that on the corresponding display apparatus can display an image based on the processed image signal. In particular, the image processing apparatus that has a display panel is called a display apparatus, and may for example includes a television (TV), a monitor, a portable multimedia player (PMP), a tablet computer, a mobile phone, etc. Further, the display apparatus may be big like the TV to be stationarily installed at a certain position, or small like the tablet PC or the mobile phone to be easily carried by a user.

The display apparatus may receive video signals from various video sources. For example, the display apparatus may receive a broadcast signal wirelessly from a transmitter of a broadcasting station or a broadcast signal through a wire. The display apparatus is tuned to a channel frequency selected by a user with regard to the received broadcast signal, and processes the tuned broadcast signal to thereby display a broadcast image of the channel selected by a user. During such tuning and processing operations, a system resource in the display apparatus is selectively assigned and distributed by the CPU.

In more detail, the display apparatus selects an internal signal processing block in accordance with types of a carrier for a video signal received from a video source, and applies the selected signal processing block to the signal processing operations. For example, the carrier for the video signal is classified into an analog type and a digital type, in which an analog video signal and a digital video signal are different in processing from each other. To support both types of the video signals, the display apparatus has to include respective signal processing blocks. In this case, the display apparatus selects a signal processing block corresponding to a type of a currently received video signal.

By the way, if the current channel and a channel to which the current channel will be switched over are different in the carrier type from each other when a user issues a command for a channel switch to the display apparatus, the channel switch may be delayed due to various internal factors. This delay may be inconvenient for a user, and thus the display apparatus has been required to more quickly perform the channel switching.

SUMMARY

Additional aspects and/or advantages will be set forth in part in the description which follows and, in part, will be apparent from the description, or may be learned by practice of the disclosure.

A display apparatus may include: a display configured to display an image based on at least one between received first and second broadcast signals, a first signal processor configured to selectively activate and inactivate an operation for processing the first broadcast signal, a second signal processor configured to selectively activate and inactivate an operation for processing the second broadcast signal, and a controller configured to control the first signal processor and the second signal processor to selectively activate or inactivate the operations for processing the first broadcast signal and the second broadcast signal in response to a command for switching between the first broadcast signal and the second broadcast signal.

The controller may activate the second signal processor to display an image of the second channel on the display in response to a command for switching over from the first channel of the first broadcast signal to the second channel of the second broadcast signal, and may keep the first signal processor activated while the image of the second channel is being displayed. Thus, it is possible to reduce time taken in activating the first signal processor from the inactivated state in response to a command for switching over from the second broadcast signal to the first broadcast signal in the future, thereby guaranteeing that the channel will be more quickly switched.

The controller may inactivate one between the first signal processor and the second signal processor, which is not currently used in processing a broadcast signal, if a level of a system load exceeds a preset threshold. Thus, it is possible to prevent the load of the whole system from exceeding an allowable limit even though the channels are repetitively repeated, thereby guaranteeing the normal performance of the display apparatus.

The display apparatus may further include a storage configured to store information about a sequence of inactivating one or more processing modules of the first signal processor and one or more processing modules of the second signal processor, wherein the controller may inactivate one or more processing modules of the first or second signal processor in sequence until the level of the system load does not exceed the threshold, based on the information about the sequence stored in the storage. Thus, the channel is switched as quickly as possible even while the normal performance of the display apparatus is guaranteed.

The processing module used in common for the first signal processor and the second signal processor may be reset corresponding to the second broadcast signal in response to the switching command.

The controller may reset the processing module by providing the processing module with channel information prepared to be referred to when the second broadcast signal is processed. Thus, the processing modules used in common for both the first broadcast signal and the second broadcast signal are operated in accordance with the channel switching.

The controller may extract the channel information from the second broadcast signal.

The controller may use the activated first signal processor to display an image of a third channel in response to a command for switching over from the second channel to the third channel of the first broadcast signal, and may keep the second signal processor activated while the image of the third channel is being displayed. Thus, it is possible to reduce time taken in activating the second signal processor from the inactivated state in response to a command for switching over from the first broadcast signal to the second broadcast signal in the future, thereby guaranteeing that the channel will be more quickly switched.

One between the first broadcast signal and the second broadcast signal may include a digital broadcast signal, and the other one between the first broadcast signal and the second broadcast signal may include an analog broadcast signal.

A method of controlling a display apparatus including a first signal processor configured to selectively activate and inactivate an operation for processing the first broadcast signal, and a second signal processor configured to selectively activate and inactivate an operation for processing the second broadcast signal, may include: displaying an image based on one between the first broadcast signal and the second broadcast signal, receiving a command for switching between the first broadcast signal and the second broadcast signal, and displaying an image based on the other one between the first broadcast signal and the second broadcast signal by controlling the first signal processor and the second signal processor to selectively activate or inactivate the operations for processing the first broadcast signal and the second broadcast signal in response to the switching command.

The displaying the image based on the other one in response to the switching command may include: activating the second signal processor to display an image of the second channel in response to a command for switching over from the first channel of the first broadcast signal to the second channel of the second broadcast signal, and keeping the first signal processor activated while the image of the second channel is being displayed. Thus, it is possible to reduce time taken in activating the first signal processor from the inactivated state in response to a command for switching over from the second broadcast signal to the first broadcast signal in the future, thereby guaranteeing that the channel will be more quickly switched.

The method may further including: determining whether a level of a system load exceeds a preset threshold, and inactivating one between the first signal processor and the second signal processor, which is not currently used in processing a broadcast signal, if it is determined that the level of the system load exceeds the threshold. Thus, it is possible to prevent the load of the whole system from exceeding an allowable limit even though the channels are repetitively repeated, thereby guaranteeing the normal performance of the display apparatus.

The inactivating one between the first signal processor and the second signal processor, which is not currently used in processing a broadcast signal, may include: inactivating one or more processing modules of the first or second signal processor in sequence until the level of the system load does not exceed the threshold, based on information about a sequence of inactivating one or more processing modules of the first signal processor and one or more processing modules of the second signal processor. Thus, the channel is switched as quickly as possible even while the normal performance of the display apparatus is guaranteed.

The displaying the image based on the other one in response to the switching command may include: making the processing module used in common for the first signal processor and the second signal processor be reset corresponding to the second broadcast signal in response to the switching command.

The making the processing module used in common for the first signal processor and the second signal processor be reset corresponding to the second broadcast signal may include: resetting the processing module by providing the processing module with channel information prepared to be referred to when the second broadcast signal is processed. Thus, the processing modules used in common for both the first broadcast signal and the second broadcast signal are operated in accordance with the channel switching.

The channel information may be extracted from the second broadcast signal.

The displaying the image based on the other one in response to the switching command may include: using the activated first signal processor to display an image of a third channel in response to a command for switching over from the second channel to the third channel of the first broadcast signal, and keeping the second signal processor activated while the image of the third channel is being displayed. Thus, it is possible to reduce time taken in activating the second signal processor from the inactivated state in response to a command for switching over from the first broadcast signal to the second broadcast signal in the future, thereby guaranteeing that the channel will be more quickly switched.

One between the first broadcast signal and the second broadcast signal may include a digital broadcast signal, and the other one between the first broadcast signal and the second broadcast signal may include an analog broadcast signal.

BRIEF DESCRIPTION OF THE DRAWINGS

The above and/or other aspects will become apparent and more readily appreciated from the following description of exemplary embodiments, taken in conjunction with the accompanying drawings, in which:

FIG. 15 illustrates a list of resources to be sequentially inactivated by a display apparatus according to a fourth exemplary embodiment if a system load is high;

DETAILED DESCRIPTION

Below, exemplary embodiments will be described in detail with reference to accompanying drawings. The following descriptions of the exemplary embodiments are made by referring to elements shown in the accompanying drawings, in which like numerals refer to like elements having substantively the same functions.

In the description of the exemplary embodiments, an ordinal number used in terms such as a first element, a second element, etc. is employed for describing variety of elements, and the terms are used for distinguishing between one element and another element. Therefore, the meanings of the elements are not limited by the terms, and the terms are also used just for explaining the corresponding embodiment without limiting the idea of the disclosure.

Further, the exemplary embodiments will describe only elements directly related to the idea of the disclosure, and description of the other elements will be omitted. However, it will be appreciated that the elements, the descriptions of which are omitted, are not unnecessary to realize the apparatus or system according to the exemplary embodiments. In the following descriptions, terms such as "include" or "have" refer to presence of features, numbers, steps, operations, elements or combination thereof, and do not exclude presence or addition of one or more other features, numbers, steps, operations, elements or combination thereof.

Further, the embodiments respectively described with reference to the accompanying drawings are not exclusive to each other unless otherwise mentioned, and a plurality of embodiments may be selectively combined within one apparatus. The combination of these plural embodiments may be discretionally selected and applied to realize the inventive concept by a person having an ordinary skill in the art.

Figure 1:
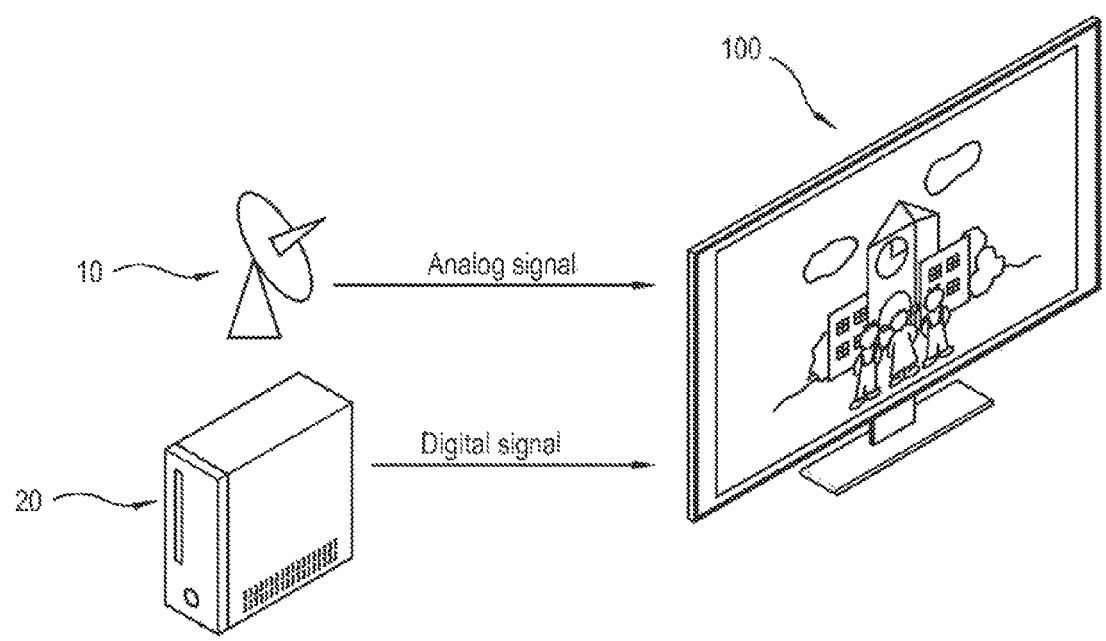
FIG. 1 illustrates a display apparatus according to a first exemplary embodiment.

FIG. 1 illustrates a display apparatus 100 according to a first exemplary embodiment.

As shown in FIG. 1, the display apparatus 100 according to the first exemplary embodiment receives a video signal involving content data from various video sources 10 and 20, and processes the video signal to display an image.

In this embodiment, the display apparatus 100 is a TV, but the display apparatus 100, to which the inventive concept is applied, is not limited to the TV. The inventive concept may be applicable to various types of the display apparatus 100, such as a monitor, a portable multimedia player, a mobile phone, a tablet computer, an electronic frame, an electronic blackboard, an electronic billboard or the like. There are no limits to whether the display apparatus 100 is a stationary type or a mobile type.

The video sources 10 and 20 may include various sources such as a transmitter of a broadcasting station, a streaming server, etc. In this embodiment, the video signal transmitted from the video sources 10 and 20 to the display apparatus 100 is a broadcast signal of a plurality of channels. However, the inventive concept may be applicable to various signals involving one or more pieces of content, and thus the characteristics and kinds of video signal are not limited to the broadcast signal.

The video source 10, 20 uses one of two transmission networks, i.e. between a broadcast method and a broadband method in order to transmit a video signal to the display apparatus 100. The broadcast method is a classical unidirectional transmission method such as a digital video broadcasting-terrestrial (DVB-T), DVB-satellite (S), DVB-cable (C), etc. As an example of the video sources 10 and 20 using the broadcast method, there is a transmitter of a broadcasting station. The broadband method uses an interactive internet protocol (IP) access for a frequency band for streaming or downloading audio/video (A/V) content. As an example of the video sources 10 and 20 using the broadband method, there is a streaming server.

Further, the video source 10, 20 selects one of two carriers, i.e. between an analog signal and a digital signal in terms of transmitting a video signal to the display apparatus 100.

The display apparatus 100 selects one designated by a user between the analog signal and the digital signal which are received from the video sources 10 and 20. The display apparatus 100 is tuned to a channel designated by a user with respect to the selected signal and processes the signal of the tuned channel, thereby displaying an image of the tuned channel. Here, the analog signal and the digital signal may have a portion to be processed in common with each other, but the other portions of the analog signal and the digital signal have to be respectively processed by different methods.

For example, in case of scaling, both the analog signal and the digital signal are processed by the same method, and therefore one scaler can be applied to these two different signals. On the other hand, in case of modulation, the analog signal and the digital signal are respectively processed by different methods, and therefore a demodulator for the analog signal may not be used in processing the digital signal. Thus, the display apparatus 100 is internally provided with structures corresponding to different processing methods for respectively supporting two different signals.

Below, elements of the display apparatus 100 will be described.

Figure 2:
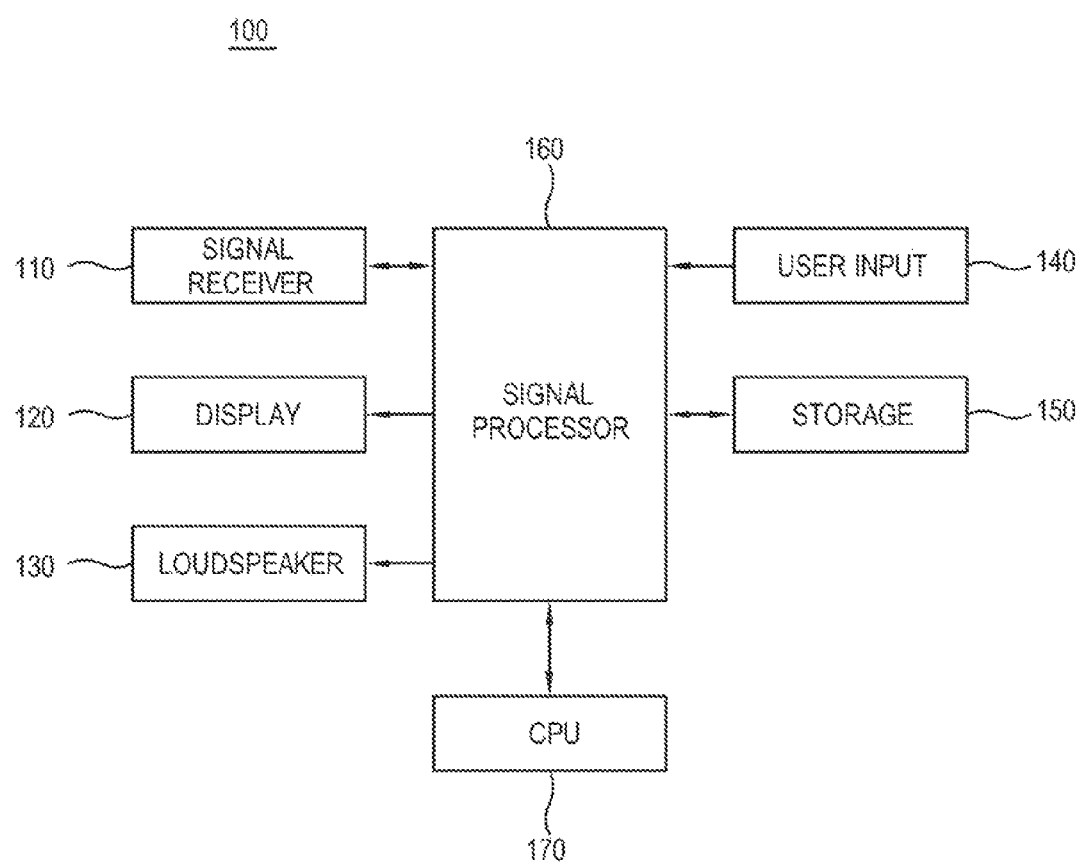
FIG. 2 is a block diagram of a display apparatus according to the first exemplary embodiment.

FIG. 2 is a block diagram of a display apparatus 100 according to the first exemplary embodiment.

As shown in FIG. 2, the display apparatus 100 may include a signal receiver 110 for receiving a carrier signal for a video signal from the exterior, a display 120 for displaying an image based on video data included in the carrier signal received in the signal receiver 110, a loudspeaker 130 for outputting a sound based on audio data included in the carrier signal received in the signal receiver 110, a user input 140 for receiving a user's input, a storage 150 for storing data, a signal processor 160 for controlling and computing general operations of the display apparatus 100, and a central processing unit (CPU) 170 for computing and controlling operations of the signal processor 160.

The signal receiver 110 receives the carrier signals from various video sources. The signal receiver 110 not only receives a signal from the exterior, but also transmits a signal to the exterior, thereby performing interactive communication. The signal receiver 110 may be achieved by an assembly of communication ports or communication modules respectively corresponding to a plurality of communication standards, and its supportable protocols and communication targets are not limited to one kind or type. For example, the signal receiver 110 may include a radio frequency integrated circuit (RFIC), a Bluetooth module, a wireless fidelity (Wi-Fi) module or the like wireless communication module (not shown) for wireless network communication; an Ethernet module (not shown) for wired network communication; a universal serial bus (USB) port (not shown) for local connection with a USB memory (not shown) or the like.

In this embodiment, the signal receiver 110 may respectively receive the carrier signals from a plurality of video sources, and may also simultaneously receive the carrier signal for the analog signal and the carrier signal for the digital signal.

The display 120 displays an image based on a video signal processed by the signal processor 160. There are no limits to the types of the display 120. For example, the display 120 may include various display panels of a liquid crystal display (LCD), an active matrix organic light emitting diode (AMOLED), a quantum-dot, etc. Further, the display 120 may include additional elements in addition to the display panel in accordance with the types of the display panel. For example, if the display 120 is achieved by the liquid crystal display, the display 130 may include a liquid crystal display (LCD) panel (not shown), a backlight unit (not shown) for emitting light to the LCD panel (not shown), and a panel driver (not shown) for driving the LCD panel (not shown).

The loudspeaker 130 outputs a sound based on an audio signal processed by the signal processor 160. The loudspeaker 130 vibrates air in accordance with an audio signal and changes air pressure to thereby make a sound. The loudspeaker 130 may include a unit loudspeaker provided corresponding to an audio signal of one audio channel. In this embodiment, the loudspeaker may include a plurality of unit loudspeakers respectively corresponding to audio signals of the plurality of channels.

There are various kinds of loudspeakers 130 in accordance with frequency bands of a sound to be output. The loudspeakers 130 include a sub-woofer corresponding to a frequency band of 20 Hz to 99 Hz, a woofer corresponding to a frequency band of 100 Hz to 299 Hz, a mid-woofer corresponding to a frequency band of 300 Hz to 499 Hz, a mid-range speaker corresponding to a frequency band of 500 Hz to 2.9 KHz, a tweeter speaker corresponding to a frequency band of 3 KHz to 6.9 KHz, and a super-tweeter speaker corresponding to a frequency band of 7 KHz to 20 KHz, in which one or more among them are selected and applied to the display apparatus 100.

The user input 140 transmits various preset control commands or information to the signal processor 160 or the CPU 170 in accordance with a user's control or input. The user input 140 transmits various events, which occurs by a user's control in accordance with a user's intention, to the signal processor 160. The user input 140 may be variously achieved in accordance with information input methods. For example, the user input 140 may be achieved by a button placed at an outer side of the display apparatus 100, a remote controller separated from the body of the display apparatus 100, a touch screen formed integrally with the display 120, and other input devices provided for communicating with the display apparatus 100.

The storage 150 stores various pieces of data under process and control of the signal processor 160 or the CPU 170. The storage 150 is accessed by the signal processor 160 and performs reading, writing, editing, deleting, updating or the like with regard to data. The storage 150 may be achieved by a flash-memory, a hard-disc drive (HDD), a solid-state drive (SSD) or the like nonvolatile memory to preserve data regardless of supply of system power in the display apparatus 100.

The signal processor 160 performs various processes with regard to the transport stream (TS) received in the signal receiver 110. When the transport stream is received in the signal receiver 110, the signal processor 160 applies a video processing process to the video signal extracted from the transport stream, and outputs the processed video signal to the display 120 so that an image can be displayed on the display 120.

There is no limit to the kind of video processing process performed by the signal processor 160, and the video processing process may for example include de-multiplexing for dividing an input transport stream into sub streams such as video data, audio data and additional data, decoding corresponding to video formats of the video signal, de-interlacing for converting video data from an interlaced type into a progressive type, scaling for adjusting a video signal to have a preset resolution, noise reduction for improving image quality, detail enhancement, frame refresh rate conversion, etc.

The signal processor 160 may perform various processes in accordance with the kind and properties of a signal or data, and therefore the process of the signal processor 160 is not limited to the video processing process. Further, the data that can be processed by the signal processor 160 is not limited to data received in the signal receiver 110. For example, the signal processor 160 performs an audio processing process with regard to audio data extracted from the transport stream, and outputs such a processed audio signal to the loudspeaker 130. In addition, if a user's speech is input to the display apparatus 100, the signal processor 160 may process the speech in accordance with a preset voice recognition process. The signal processor 160 may be achieved in the form of a system-on-chip (SoC) where various functions corresponding to such processes are integrated, or an image processing board where individual chip-set for independently performing the respective processes are mounted to a printed circuit board.

In this embodiment, the CPU 170 is independent of the signal processor 160. Alternatively, the CPU 170 may be achieved in the form of a single system-on chip (SOC) as it is integrated into a chipset having various functions, such as the signal processor 160.

The CPU 170 is an element for performing central calculation to operate general elements in the signal processor 160, and plays a central role in basically parsing and calculating data. The CPU 170 internally may include a processor register (not shown) in which commands to be processed are stored; an arithmetic logic unit (ALU) (not shown) being in charge of comparison, determination and calculation; a control unit (not shown) for internally controlling the CPU 170 to analyze and carry out the commands; an internal bus (not shown), a cache (not shown), etc.

Basically, the CPU 170 performs calculation needed for operating the elements of the signal processor 160. Alternatively, some elements of the signal processor 160 may be designed to operate without the data calculation of the CPU 170 or operate by a separate microcontroller (not shown).

Such hardware elements of the display apparatus 100 may be varied in detail depending on the types of the display apparatus 100 and the functions supported by the display apparatus 100. For example, if the display apparatus 100 is a TV or a set-top box, there is a need of an element to be tuned to a certain frequency with respect to a broadcast signal. However, if the display apparatus 100 is a tablet computer, there may be no need of such a tuning element.

The foregoing schematically describes the basic internal elements of the display apparatus 100. Below, the internal elements of the display apparatus 100 for receiving and processing the analog broadcast signal and the digital broadcast signal will be described in more detail. In the following exemplary embodiments, the analog broadcast signal transmitted from the video source to the display apparatus 100 will be called an ATV signal, and the digital broadcast signal transmitted from the video source to the display apparatus 100 will be called a DTV signal.

Figure 3:
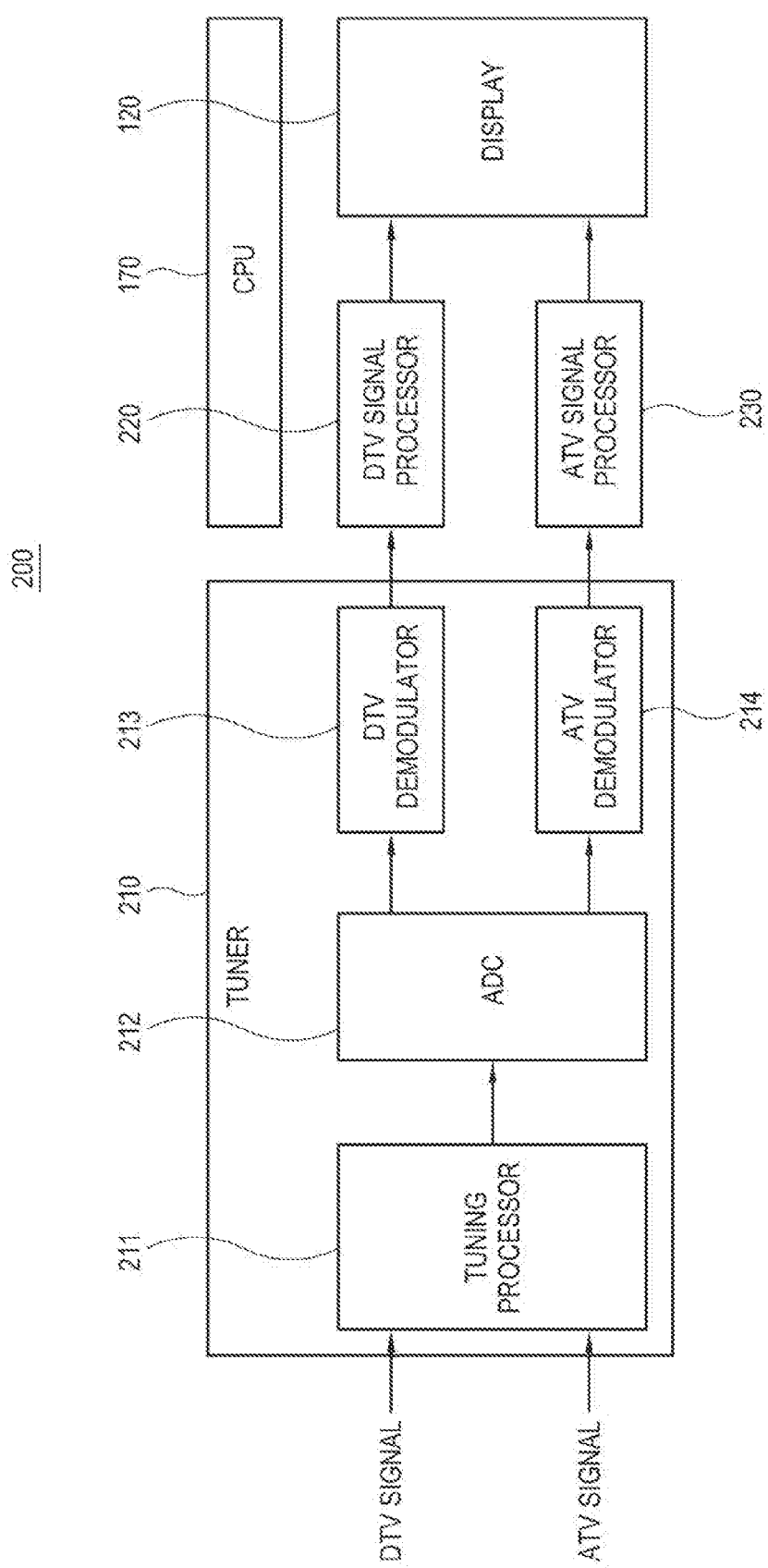
FIG. 3 is a block diagram of a tuner in the display apparatus according to the first exemplary embodiment.

FIG. 3 is a block diagram of a tuner 210 in the display apparatus according to the first exemplary embodiment. In this embodiment, the signal processor 200 is to explain the foregoing signal processor 120 shown in FIG. 2 in more detail.

As shown in FIG. 3, the signal processor 200 may include a tuner 210 which is tuned to an ATV signal or a DTV signal with respect to a certain frequency and outputs a modulated signal, a DTV signal processor 220 which processes the modulated DTV signal output from the tuner 210, and an ATV signal processor 230 which processes the modulated ATV signal output from the tuner 210.

In this embodiment, the tuner 210 is an internal element of the signal processor 200, but not limited thereto. Alternatively, the tuner 210 may be an internal element of not the signal processor 200 but the signal receiver 110 (see FIG. 2). Since this is variable depending on how to design the display apparatus, this embodiment does not limit the realization of the inventive concept.

The tuner 210 may include a tuning processor 211 to be tuned to a modulated ATV signal or a modulated DTV signal, an analog-to-digital converter (ADC) 212 for converting the ATV signal tuned by the tuning processor 211 into a digital signal, a DTV demodulator 213 for demodulating the tuned DTV signal, and an ATV demodulator 214 for demodulating the tuned ATV signal. In this embodiment, the tuning processor 211, the ADC 212, the DTV demodulator 213 and the ATV demodulator 214 are integrated into the tuner in the form of one chip. However, this embodiment is nothing but an example. As necessary, the tuner 210 may include only the tuning processor 211, and the ADC 212, the DTV demodulator 213 and the ATV demodulator 214 may be separated from the tuner 210.

The tuning processor 211 receives the ATV signal or the DTV signal from a plurality of video sources, respectively. Here, signals received in the tuning processor 211 are signals modulated in the video sources which transmit the broadcast signal. The tuning processor 211 converts a received high frequency carrier wave into an intermediate frequency (IF) signal. The tuning processor 211 receives a preset tuning control signal transmitted inside the display apparatus, and is tuned to the ATV signal or the DTV signal with respect to a frequency of a channel indicated by the received tuning control signal. Here, the tuning control signal may for example correspond to a channel switching command from the user input 140 (see FIG. 2).

The ADC 212 converts an analog IF signal received from the tuning processor 211 into a digital IF signal. If the signal received from the tuning processor 211 is a digital signal, the ADC 212 may directly output the signal without converting it.

The DTV demodulator 213 and the ATV demodulator 214 demodulate the IF signals output from the ADC 212. Since the DTV signal and the ATV signal are different in modulation from each other, the DTV signal may be for example demodulated by at least one of 8VSB, ISDB-T, DVB-T and DMB-TH, and the ATV signal may be for example demodulated by at least one of NTSC, PAL and SECAM. Therefore, it may be difficult for one modulator to demodulate both the DTV signal and the ATV signal. In this embodiment, modulators 213 and 214 are respectively prepared for the DTV signal and the ATV signal. That is, the DTV demodulator 213 processes the DTV signal, and the ATV demodulator 214 processes the ATV signal.

The DTV demodulator 213 outputs the demodulated DTV signal to the DTV signal processor 220. Here, the demodulated DTV signal may include a transport stream in which a digital compressed video signal, a digital compressed audio signal and digital compressed additional data are mixed in sequence.

The ATV demodulator 214 outputs the demodulated ATV signal to the ATV signal processor 230. Here, the demodulated ATV signal may include a sound intermediate frequency (SIF) signal for example having a central frequency of 4.5 MHz. During the demodulation, the ATV demodulator 214 divides the ATV signal into the video signal and the audio signal, and outputs the video signal and the audio signal.

The DTV signal processor 220 processes the DTV signal output from the DTV demodulator 213 and outputs the processed signal to the display 120. The ATV signal processor 230 processes the ATV signal output from the ATV demodulator 214 and outputs the processed signal to the display 120. Thus, the display 120 displays an image based on one of the DTV signal and the ATV signal.

Below, elements of the DTV signal processor 220 and the ATV signal processor 230 will be described.

Figure 4:
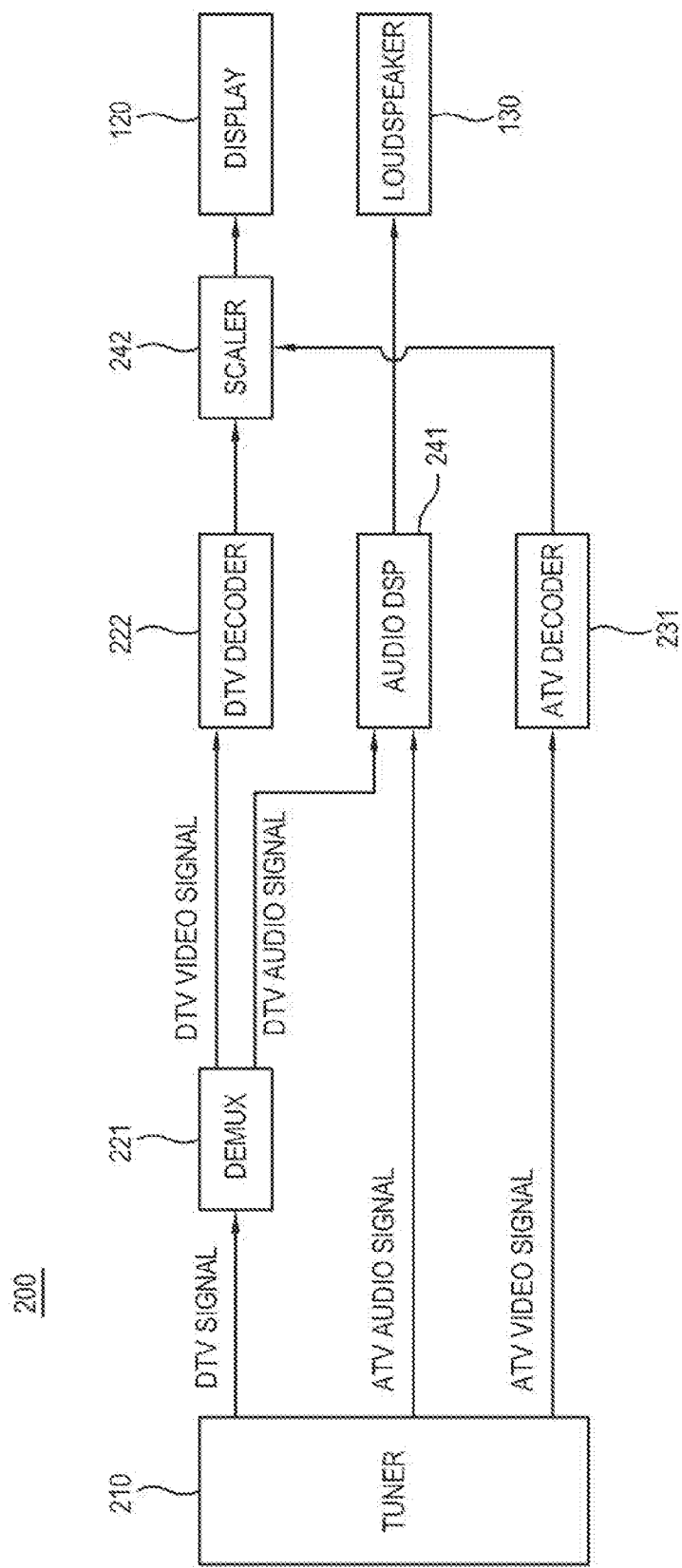
FIG. 4 is a block diagram of a digital television (DTV) signal processor and an analog television (ATV) signal processor in the display apparatus according to the first exemplary embodiment.

FIG. 4 is a block diagram of a digital television (DTV) signal processor and an analog television (ATV) signal processor in the display apparatus according to the first exemplary embodiment.

As shown in FIG. 4, the signal processor 200 may include a demultiplexer (deMUX) 221 which divides the transport stream of the DTV signal output from the tuner 210 into a plurality of sub-streams and outputs the sub-streams, a DTV decoder 222 which decodes a video signal among the sub-streams output from the demultiplexer 221, an ATV decoder 231 which decodes a video signal of the ATV signal output from the tuner 210, an audio digital signal processor (DSP) 241 which processes an audio signal of the sub-streams output from the demultiplexer 221 or an audio signal of the ATV signal output from the tuner 210 and outputs the processed audio signal to the loudspeaker 130, and a scaler 242 which applies scaling to the video signal output from the DTV decoder 222 or the ATV decoder 231 and outputs the processed video signal to the display 120.

Here, the demultiplexer 221 and the DTV decoder 222 belong to the DTV signal processor, and the ATV decoder 231 belongs to the ATV signal processor. The audio DSP 241 and the scaler 242 are shared between the DTV signal processor and the ATV signal processor since the audio DSP 241 and the scaler 242 can operate for both the DTV signal and the ATV signal. Alternatively, the audio DSP 241 and the scaler 242 may be prepared for each of the DTV signal processor and the ATV signal processor.

The demultiplexer or demux 221 basically plays an opposite role of a multiplexer (not shown). That is, the demultiplexer 221 connects one input terminal into a plurality of output terminals, so that the stream input to the input terminal can be distributed to each of the output terminals in response to a selection signal. For example, if there are four output terminals with respect to one input terminal, the demultiplexer 221 may select one among four output terminals by combining two selection signals having states of '0' and '1'. In particular, if the demultiplexer 221 is applied to the display apparatus 100, the demultiplexer 221 divides the transport stream of the DTV signal output from the tuner 210 into the sub-streams of the digital video signal and the digital audio signal and respectively outputs them to the out terminals.

The demultiplexer 221 may have many methods to divide the transport stream into the sub-streams. For example, the demultiplexer 221 may divide the transport stream into the sub-streams in accordance with packet identifiers (PID) respectively assigned to packets of the transport stream. The sub-streams according to the channels in the transport stream are independently compressed and packetized, in which packets corresponding to a certain channel are assigned with the same PID and thus distinguished from a packet of another channel. The demultiplexer 221 sorts the packets according to the PID in the transport stream, and extracts the sub-streams having the same PID.

The DTV decoder 222 decodes the DTV video signal output from the demultiplexer 221. For example, the DTV decoder may be provided to decode various video formats such as moving picture experiment group (MPEG), etc. The DTV decoder 222 may output a video signal without decoding if the DTV video signal output from the demultiplexer 221 is not compressed, i.e. does not have to be decoded.

The ATV decoder 231 decodes the ATV video signal output from the tuner 210. In this exemplary embodiment, the video signal input to the ATV decoder 231 is extracted by the tuner 210, but not limited thereto. Alternatively, a separate element for dividing the ATV signal output from the tuner 210 into the ATV video signal and the ATV audio signal may be provided like the demultiplexer 221 for processing the DTV signal.

The audio DSP 241 amplifies the audio signal output from the demultiplexer 221 or the tuner 210 and outputs the amplified audio signal to the loudspeaker 130. There are two audio signals to be input to the audio DSP 241, in which one is the DTV audio signal output from the demultiplexer 221 and the other one is the ATV audio signal output from the tuner 210. That is, the audio DSP 241 can process both the DTV audio signal and the ATV audio signal.

To this end, the audio DSP 241 may include a digital signal supplier (not shown) for supplying an audio signal of a digital signal, a pulse width modulation (PWM) processor (not shown) for outputting a PWM signal based on the digital signal output from the digital signal supplier (not shown), an amplifier (not shown) for amplifying the PWM signal output from the PWM processor (not shown), an LC filter (not shown) for demodulating the PWM signal by filtering the PWM signal amplified by the amplifier (not shown) at a certain frequency band.

The scaler 242 applies scaling to the DTV video signal output from the DTV decoder 222 or the ATV video signal output from the ATV decoder 231 in accordance with a preset resolution and outputs it to the display 120. That is, the scaler may be employed for both the DTV video signal and the ATV video signal. The scaler 242 selectively performs upscaling or downscaling in accordance with the set resolution. The upscaling is to make a resolution higher than a resolution of an input video signal, and the downscaling is to make a resolution lower than a resolution of an input video signal.

With this structure, the display apparatus 100 determines whether a content signal or broadcast signal received from the video source is a DTV signal or an ATV signal, and selectively assigns respective resources of the display apparatus 100 to signal processing operations.

Below, a method of selecting and assigning the resources by the display apparatus 100 in accordance with the carrier types of the broadcast signal will be described.

Figure 5:
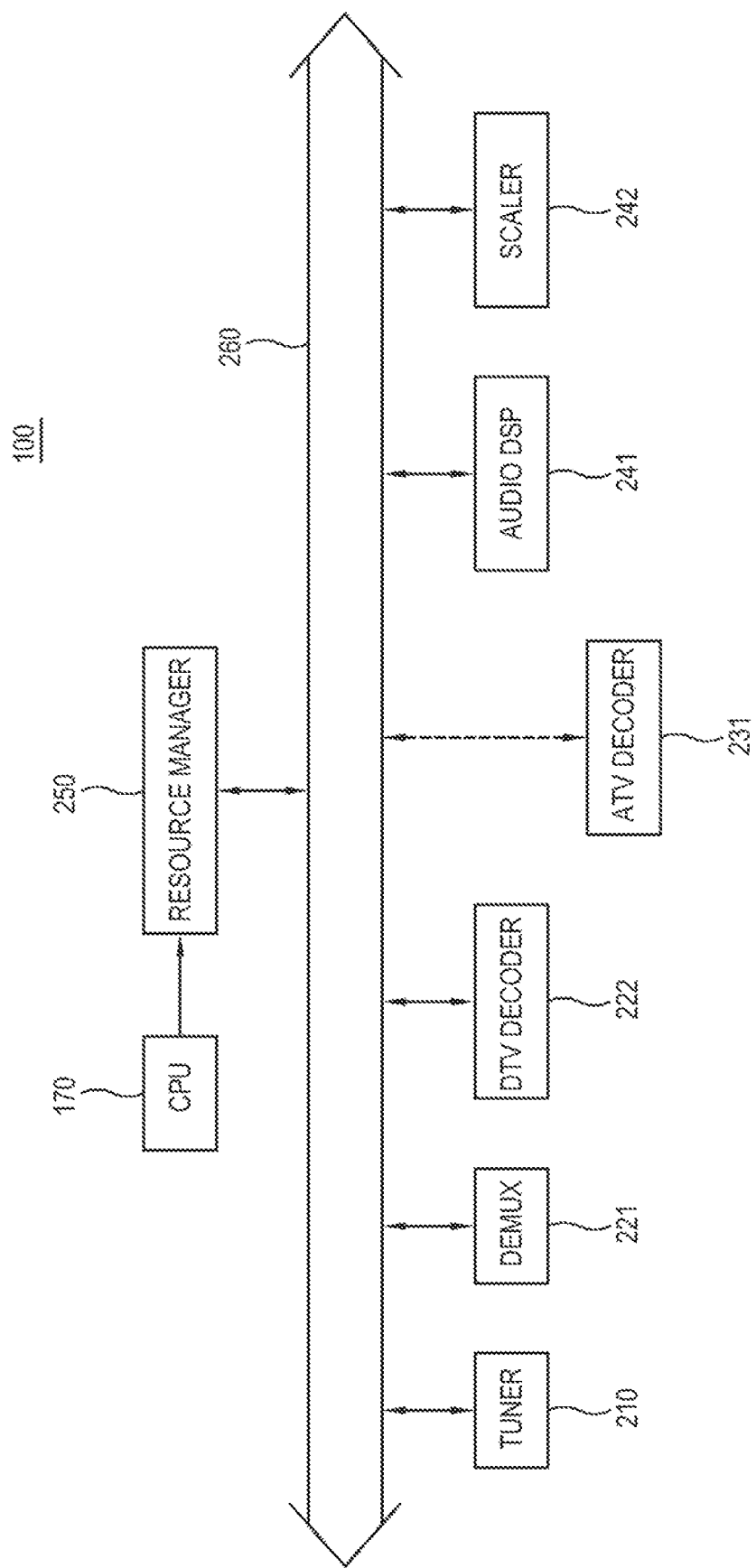
FIG. 5 illustrates an example of assigning resources when the display apparatus according to the first exemplary embodiment receives a DTV signal.

FIG. 5 illustrates an example of assigning resources when the display apparatus 100 according to the first exemplary embodiment receives a DTV signal.

As shown in FIG. 5, the display apparatus 100 executes a resource manager 250 to select and assign the resources. The resource manager 250 is software to be executed by the CPU 170, which may be a program code integrated into an operating system or an application to be run on the operating system. The resource manager 250 may have access to the respective resources through a system bus 260. In an initial state, the respective resources may be inactivated.

If it is determined that the display apparatus 100 receives the DTV signal, the resource manager 250 selects the resources prepared for processing the DTV signal among the whole resources. As such resources, there are the tuner 210, the demultiplexer 221, the DTV decoder 222, the audio DSP 241 and the scaler 242. The resource manager 250 activates the selected resources, and assigns the activated resources to the operations of processing the DTV signal. Further, the resource manager 250 inactivates the resources unnecessary for processing the DTV, i.e. the ATV decoder, and thus excludes the inactivated resources from the operations of processing the DTV signal.

The resources may be activated or inactivated by various ways. For example, if the resource manager 250 selects a resource for processing a certain signal and the resource is assigned with a certain processing sequence in the operations of processing the signal, it is regarded that this resource is activated. Further, if the resource manager 250 does not select a resource for processing a certain signal, it is regarded that this resource is inactivated.

Alternatively, the resource may be regarded as it is activated when the power is supplied thereto, and inactivated when the power is prevented from being supplied thereto. Further, the resource may be regarded as it is activated when the content signal or broadcast signal is input thereto, and inactivated when the content signal or broadcast signal is prevented from being input thereto.

Thus, the activation or inactivation state of the resources may be variously given in accordance with design of the display apparatus 100.

Figure 6:
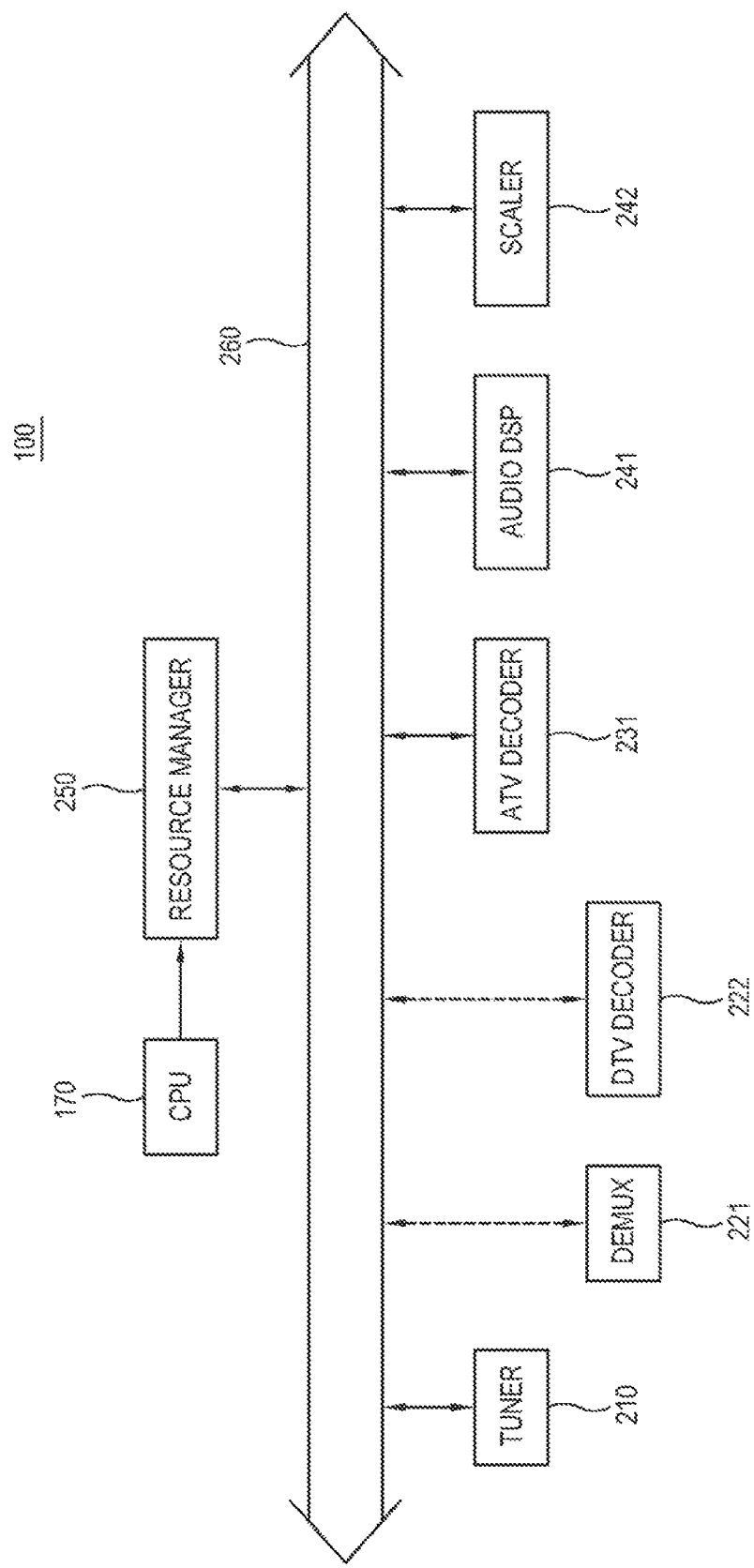
FIG. 6 illustrates an example of assigning resources when the display apparatus according to the first exemplary embodiment receives an ATV signal.

FIG. 6 illustrates an example of assigning resources when the display apparatus 100 according to the first exemplary embodiment receives an ATV signal.

As shown in FIG. 6, if it is determined that the display apparatus 100 receives the ATV signal, the resource manager 250 selects the resources prepared for processing the ATV signal among all the resources. The selected resources may include the tuner 210, the audio DSP 241, the ATV decoder 231 and the scaler 242. The resource manager 250 activates the selected resources, and assigns the activated resources to the operations of processing the ATV signal. Further, the resource manager 250 inactivates the resources such as the demultiplexer 221 and the DTV decoder 222 unnecessary for processing the ATV signal, thereby excluding the inactivated resources from the operations of processing the ATV signal.

Here, referring back to FIG. 3, the tuner 210 is internally provided with the elements such as the tuning processor 211 (see FIG. 3), the ADC 212 (see FIG. 3), the DTV demodulator 213 (see FIG. 3) and the ATV demodulator 214 (see FIG. 3), which are selectively used in accordance with carrier types of a received signal. In this embodiment, the tuner 210 has a structure of one-chip, and therefore the tuner 210 is employed in processing both the DTV signal and the ATV signal. If the tuner 210 has a structure of not one-chip but individual elements, the resource manager 250 may individually control the internal elements to process the DTV signal and the ATV signal.

Figure 7:
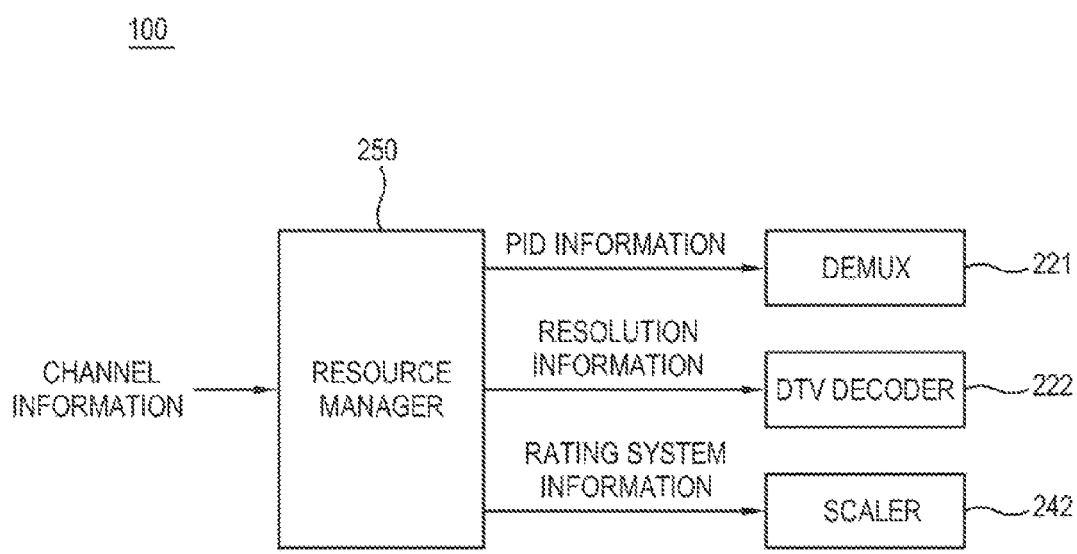
FIG. 7 illustrates an example of providing channel information to respective resources when a resource manager processes a DTV signal in the display apparatus according to the first exemplary embodiment.

FIG. 7 illustrates an example of providing channel information to respective resources when a resource manager 250 processes a DTV signal in the display apparatus 100 according to the first exemplary embodiment.

As shown in FIG. 7, when the DTV signal is received, the resource manager 250 selects the resources for selecting the DTV signal, and provides channel information, which is needed for the selected resources to process the DTV signal, to the respective resources. The channel information may include various pieces of information such as PID information, resolution information, video rating system information or the like to be referred to for processing the signal.

For example, the demultiplexer 221 among the resources extracts a video signal, an audio signal and additional data from the DTV signal in accordance with the PID information. The DTV decoder 222 decodes the video signal in accordance with resolution information. The scaler 242 determines whether to display a video signal in accordance with the video rating system information. The resource manager 250 acquires the channel information such as the PID information, the resolution information, the video rating system information, etc. and provides it to the respective resources so that the respective resources can process the signal.

The channel information is included in the broadcast signal received in the display apparatus 100, and thus the resource manager 250 acquires the channel information extracted from the broadcast signal. Further, the resource manager 250 may acquire the channel information previously stored in the storage 150 (see FIG. 2) of the display apparatus 100. In addition, the resource manager 250 may acquire the channel information from an external device (not shown) such as a server or the like, separately from the broadcast signal.

This embodiment describes only the DTV signal. However, in case of the ATV signal, the channel information for processing the ATV signal is also provided to the respective resources.

With this structure, a user may issue a command for switching over from a channel of the DTV broadcast signal to a channel of the ATV broadcast signal or a command for switching over from the channel of the ATV broadcast signal to the channel of the DTV broadcast signal. Below, a method of switching a channel by the display apparatus in response to a command for switching the channel will be described.

Figure 8:
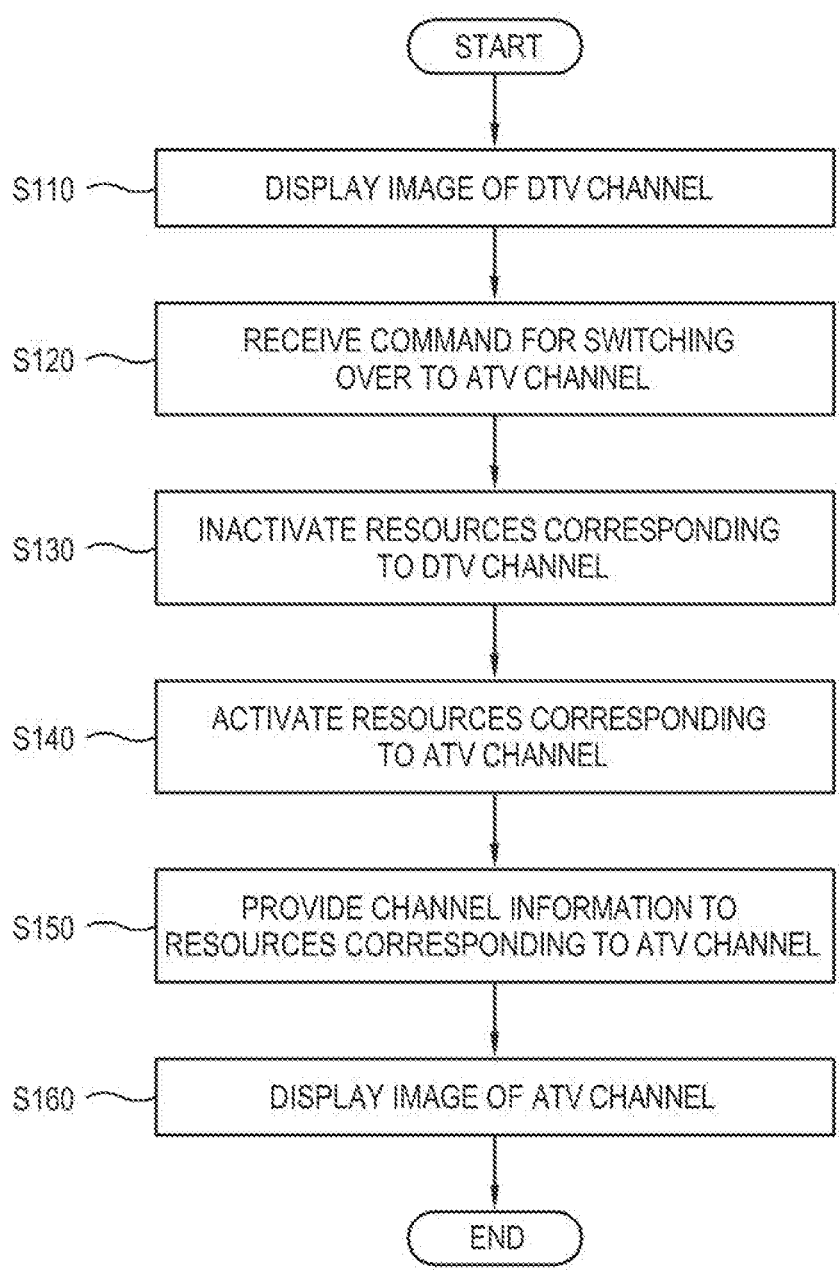
FIG. 8 is a flowchart that the display apparatus according to the first exemplary embodiment switches a channel over from a DTV channel image to an ATV channel image.

FIG. 8 is a flowchart that the display apparatus according to the first exemplary embodiment switches a channel over from a DTV channel image to an ATV channel image.

As shown in FIG. 8, at operation S110, the display apparatus displays a DTV channel image. In this operation, the resources corresponding to the DTV channel are activated to display the DTV channel image, but the resources corresponding to the ATV channel are inactivated.

At operation S120, the display apparatus receives a command for switching over to the ATV channel. Such a command may be for example issued based on a user's input, or automatically issued by preset scheduling.

At operation S130, the display apparatus inactivates all the resources corresponding to the DTV channel in response to the switching command. For example, the display apparatus inactivates all the elements for displaying the DTV channel image, e.g. the tuner, the demultiplexer, the DTV decoder, the audio DSP and the scaler.

At operation S140, the display apparatus activates the resources corresponding to the ATV channel. For example, the display apparatus activates the elements for displaying the ATV channel image, e.g. the tuner, the ATV decoder, the audio DSP and the scaler.

At operation S150, the display apparatus provides the channel information to the resources corresponding to the ATV channel. The channel information may be extracted from the ATV broadcast signal.

At operation S160, the display apparatus displays the ATV channel image.

Through these operations, the display apparatus may switch from the DTV channel to the ATV channel.

Figure 9:
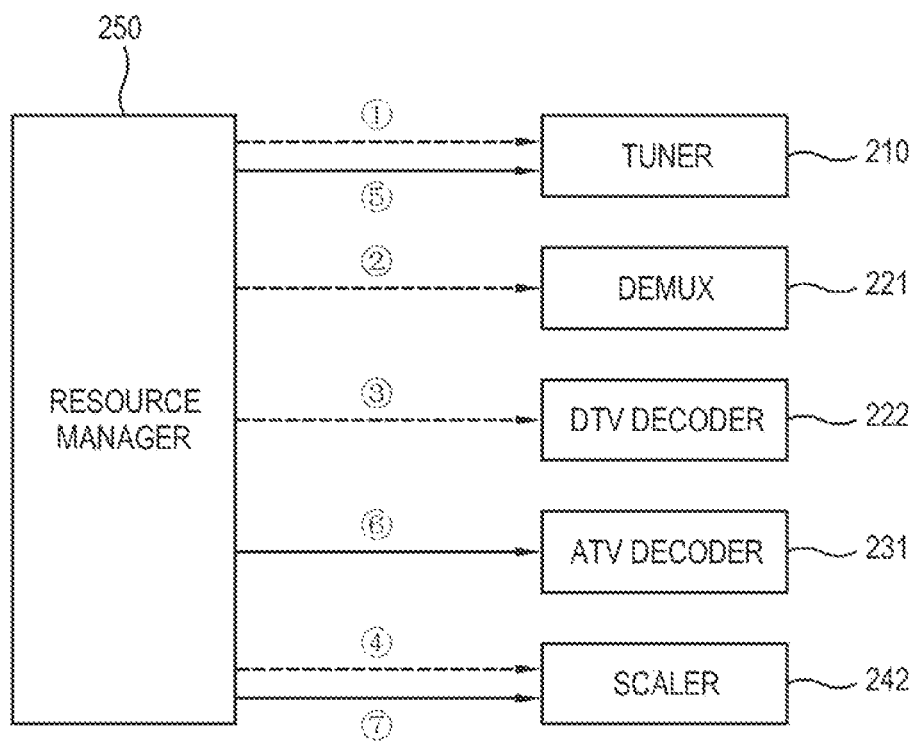
FIG. 9 illustrates a sequence of activating or inactivating the respective resources when the display apparatus according to the first exemplary embodiment switches over from a DTV channel to an ATV channel.

FIG. 9 illustrates a sequence of activating or inactivating the respective resources when the display apparatus 100 according to the first exemplary embodiment switches over from a DTV channel to an ATV channel.

As shown in FIG. 9, the resource manager 250 inactivates the respective resources prepared for processing the DTV video signal in response to a command for switching over from the DTV channel to the ATV channel. For example, the resource manager 250 first inactivates the tuner 210, and then inactivates the demultiplexer 221, the DTV decoder 222 and the scaler 242 in sequence. In FIG. 9, the dotted arrow refers to the operations of inactivating the resources, and the solid arrow refers to the operations of activating the resources.

Next, the resource manager 250 activates the respective resources prepared for processing the ATV video signal. For example, the resource manager 250 first activates the tuner 210, and then activates the ATV decoder 231 and the scaler 242 in sequence.

Next, the resource manager 250 provides the channel information about the ATV video signal to the respective resources prepared for processing the ATV video signal, i.e. the tuner 210, the ATV decoder 231 and the scaler 242. Thus, the display apparatus 100 displays an ATV channel image.

In such a state that the ATV channel image is being displayed in response to channel switching, a user may issue a command for switching over to the DTV channel again.

Figure 10:
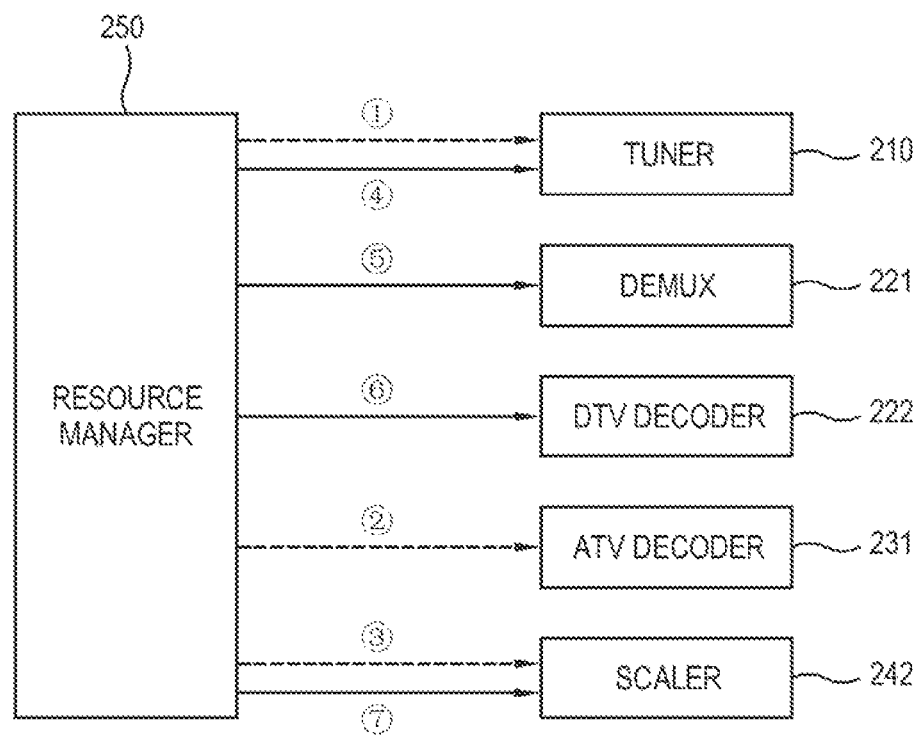
FIG. 10 illustrates a sequence of activating or inactivating the respective resources when the display apparatus according to the first exemplary embodiment switches over from an ATV channel to a DTV channel.

FIG. 10 illustrates a sequence of activating or inactivating the respective resources when the display apparatus 100 according to the first exemplary embodiment switches over from an ATV channel to a DTV channel.

As shown in FIG. 10, the resource manager 250 inactivates the respective resources prepared for processing the ATV video signal in response to a command for switching over from the ATV channel to the DTV channel. For example, the resource manager 250 first inactivates the tuner 210, and then inactivates the ATV decoder 231 and the scaler 242 in sequence. Like the embodiment shown in FIG. 9, the dotted arrow in FIG. 10 refers to the operations of inactivating the resource, and the solid arrow refers to the operations of activating the resources.

Next, the resource manager 250 activates the respective resources prepared for processing the DTV video signal. For example, the resource manager 250 first activates the tuner 210 and then activates the demultiplexer 221, the DTV decoder 222 and the scaler 242 in sequence.

Next, the resource manager 250 provides the channel information about the DTV video signal to the respective resources prepared for processing the DTV video signal, i.e. to the tuner 210, the demultiplexer 221, the DTV decoder 222 and the scaler 242. Thus, the display apparatus 100 displays the DTV channel image.

By the way, in the foregoing operations of switching over from the DTV channel to the ATV channel and then switching over from the ATV channel to the DTV channel, the display apparatus 100 starts activating the resources corresponding to the channel targeted for switching after all the resources corresponding to the current channel are completely inactivated. Therefore, the channel switching is delayed at least until all the resources corresponding to the current channel are completely inactivated, and thus display of an image of the channel targeted for switching is also delayed.

Below, a second exemplary embodiment improved in this regard will be described. Basic structures of the display apparatus according to the second exemplary embodiment are equivalent to those of the first exemplary embodiment, and thus detailed descriptions thereof will be omitted.

Figure 11:
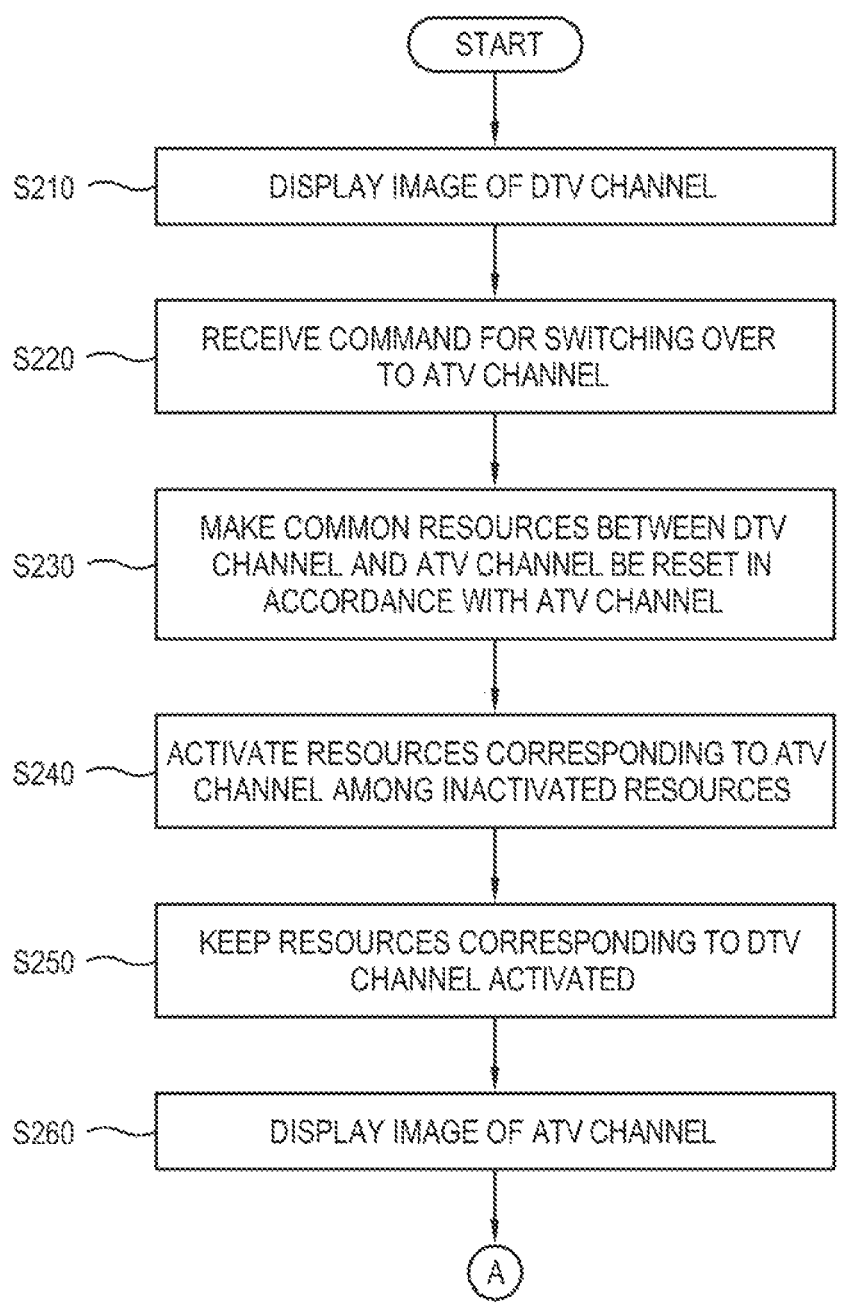
FIG. 11 and FIG. 12 are flowcharts that a display apparatus according to a second exemplary embodiment switches over from a DTV channel to a ATV channel and then switches the ATV channel to the DTV channel.
Figure 12:
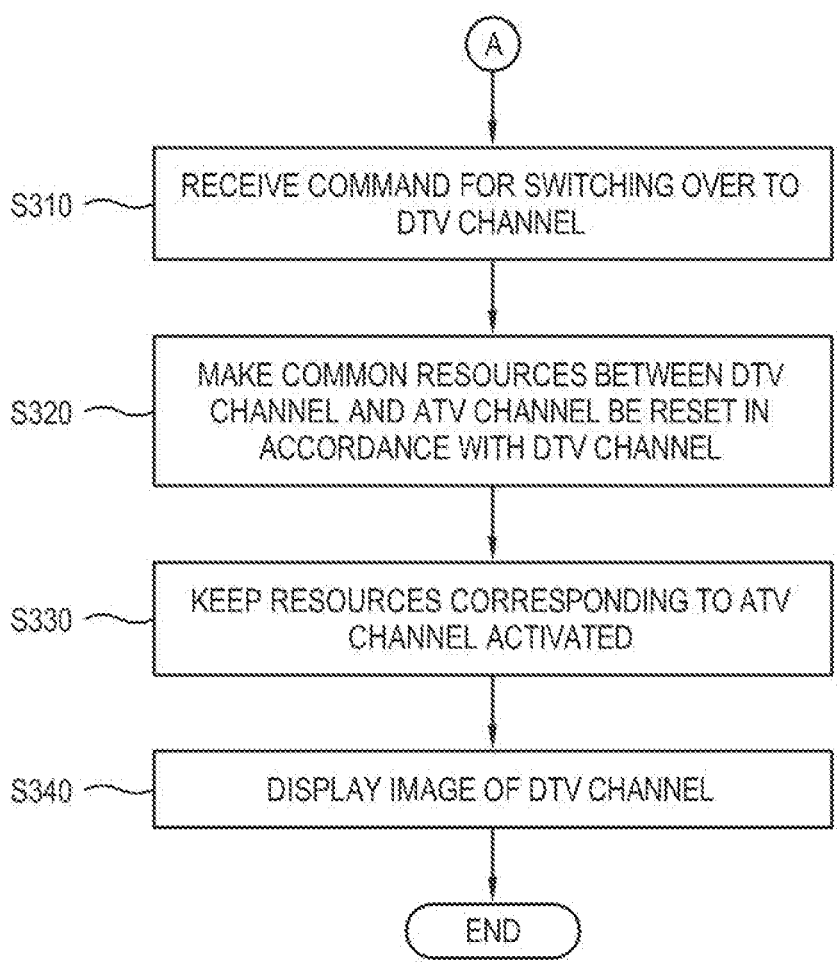

FIG. 11 and FIG. 12 are flowcharts that a display apparatus according to a second exemplary embodiment switches over from a DTV channel to an ATV channel and then switches the ATV channel to the DTV channel. The operation of switching over from the ATV channel to the DTV channel and then switching over to the ATV again will be described in the following embodiments, and thus repetitive descriptions thereof will be omitted.

As shown in FIG. 11, at operation S210, the display apparatus according to the second exemplary embodiment displays a DTV channel image. In this operation, the resources corresponding to the DTV channel are activated to display the DTV channel image, but the resources corresponding to the ATV channel are inactivated.

At operation S220, the display apparatus receives a command for switching over to the ATV channel. Such a command may be for example issued based on a user's input, or automatically issued by preset scheduling.

At operation S230, the display apparatus makes the resources prepared in common for both the DTV channel and the ATV channel be reset in accordance with the ATV channel in response to the switching command. For example, if the tuner and the scaler are provided as the common resources prepared for both the DTV channel and the ATV channel, the display apparatus makes the tuner and the scaler, which are currently set to correspond to the DTV channel, be reset to correspond to the ATV channel.

There are many ways of resetting the resources. For example, the display apparatus may control the tuner locked to output the DTV signal to be set to output the ATV signal. Further, the display apparatus resets the channel information corresponding to the DTV signal to be referred to by the scaler, and then provides the scaler with the channel information corresponding to the ATV signal.

At operation S240, the display apparatus activates the resources corresponding to the ATV channel among the inactivated resources. For example, since the resources prepared in common for both the DTV channel and the ATV channel, i.e. the tuner and the scaler are being currently activated, the display apparatus activates the currently inactivated ATV decoder among the resources for displaying an ATV channel image.

The operation S230 and the operation S240 may be exchanged. That is, the display apparatus may activate the ATV decoder, and then reset the tuner and the scaler.

At operation S250, the display apparatus keeps the activation states of the resources corresponding to the DTV channel. For example, among the resources for displaying the DTV channel image, the tuner and the scaler are the resources employed in common for both the DTV channel and the ATV channel, and the demultiplexer and the DTV decoder are the resources employed only for the DTV channel. The display apparatus does not inactivate but keeps the demultiplexer and the DTV decoder activated.

At operation S260, the display apparatus displays an image of the ATV channel image.

As shown in FIG. 12, at operation S310, the display apparatus receives a command for switching over to the DTV channel.

At operation S320, the display apparatus makes the resources prepared in common for both the DTV channel and the ATV channel be reset to correspond to the DTV channel in response to the switching command. For example, if the tuner and the scaler are the resources prepared in common for both the DTV channel and the ATV channel, the display apparatus makes the tuner and the scaler, which are currently set to correspond to the ATV channel, be reset to correspond to the DTV channel.

At operation S330, the display apparatus keeps the activation states of the resources corresponding to the ATV channel. For example, among the resources for displaying the ATV channel image, the tuner and the scaler are the resources used in common for both the DTV channel and the ATV channel, and the ATV decoder are the resources used only for the ATV channel. The display apparatus does not inactivate but keeps the ATV decoder activated.

At operation S340, the display apparatus displays an image of the DTV channel.

As described above, if it is desired to switch over from a first channel of one between the DTV channel and the ATV channel to a second channel of the other one between the DTV channel and the ATV channel, the display apparatus in this embodiment activates the resources prepared for processing the second channel to display an image of the second channel, and keeps the activation states of the resources prepared for processing the first channel. Therefore, when the second channel is switched over to the first channel in the future, the display apparatus can switch the channel directly without newly activating the resources since the resources provided for processing the second channel are already activated.

Thus, the display apparatus can minimize time taken in switching the channel, and prevent switching delay.

Figure 13:
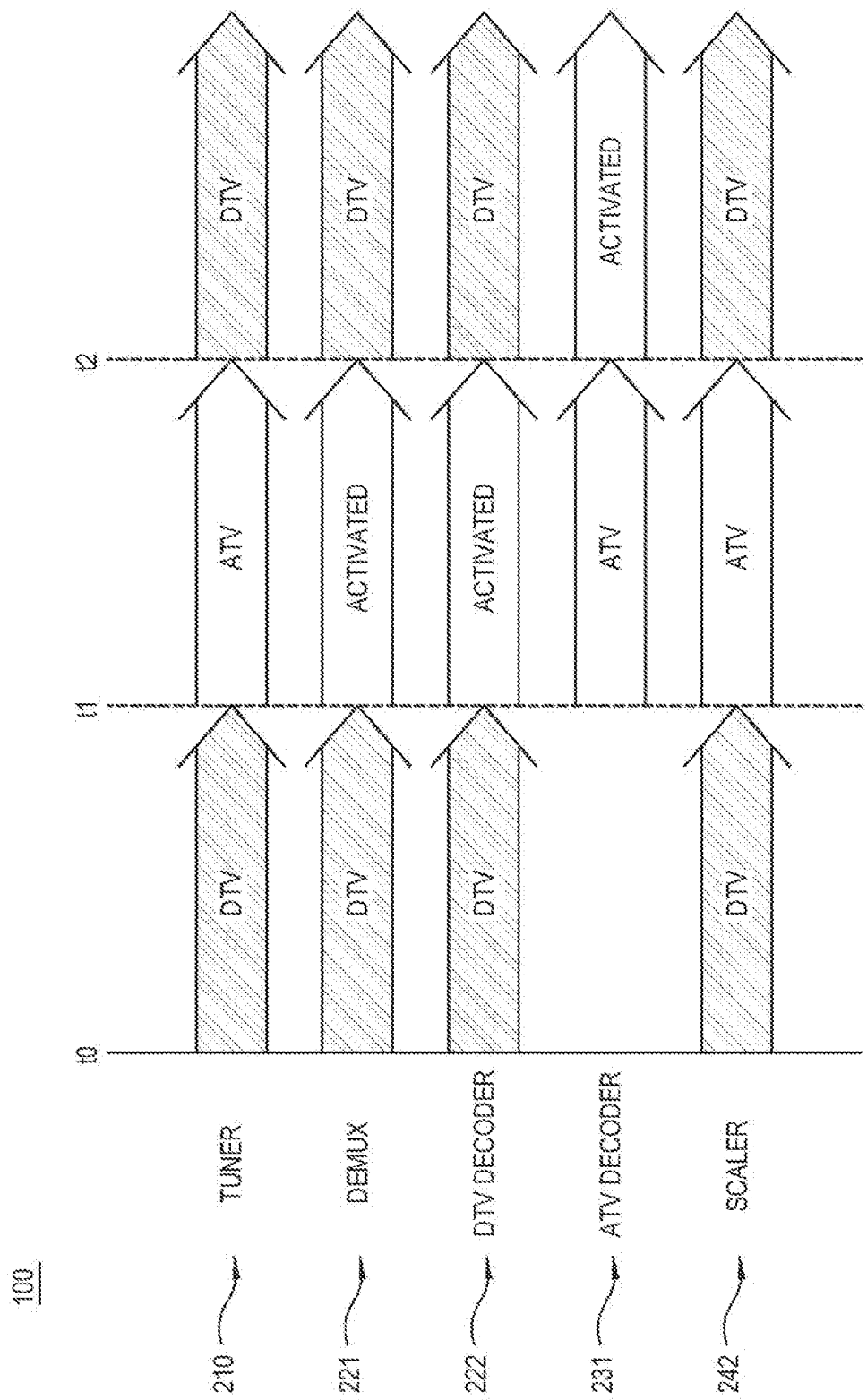
FIG. 13 illustrates timelines showing activation states of respective resources in the display apparatus according to the second exemplary embodiment.

FIG. 13 illustrates timelines showing activation states of respective resources in the display apparatus 100 according to the second exemplary embodiment.

As shown in FIG. 13, the display apparatus 100 may include the resources such as the tuner 210, the demultiplexer 221, the DTV decoder 222, the ATV decoder 231 and the scaler 242. If time of t0, t1 and t2 is given in order of time, the DTV channel image is displayed at the initial time of t0 where the display apparatus 100 is turned on and starts operations, an event for switching over to the ATV channel occurs at the time of t1, and an event for switching over to the DTV channel occurs at the time of t2.

During a time section between t0 and t1 where the DTV channel image is being displayed, the tuner 210, the demultiplexer 221, the DTV decoder 222 and the scaler 242 are activated to process the DTV broadcast signal. During this time section, the ATV decoder 231 is inactivated.

During a time section between t1 and t2 where the ATV channel image is being displayed, the tuner 210, the ATV decoder 231 and the scaler 242 are activated to process the ATV broadcast signal. The tuner 210 and the scaler 242 are used for processing the DTV broadcast signal during the foregoing time section between t0 and t1, but are set to process the ATV broadcast signal during the time section between t1 and t2. During this time section, the demultiplexer 221 and the DTV decoder 222 are kept activated even though they are not used in processing the ATV broadcast signal. Even if the ATV broadcast signal is into to the demultiplexer 221, the processing structure of the demultiplexer 221 cannot process the ATV broadcast signal since it is not suitable for the ATV broadcast signal.

During a time section after t2 where the DTV channel image is displayed again, the tuner 210, the demultiplexer 221, the DTV decoder 222 and the scaler 242 are activated to process the DTV broadcast signal. The tuner 210 and the scaler 242 are set again to process the DTV broadcast signal. Since the demultiplexer 221 and the DTV decoder 222 are kept activated during the time section between t1 and t2, the DTV channel image can be displayed with minimum delay in response to a command for channel switching.

Further, the ATV decoder 231 is kept activated during this time section even though it does not process the DTV broadcast signal. Thus, it is possible to quickly display the ATV channel image with a minimum delay when a command for switching over to the ATV channel occurs in the future.

As described above, it is possible to switch the channel quickly according to the second exemplary embodiment. When the display apparatus 100 is initially turned on, only the resources prepared corresponding to the broadcast signal to be currently processed are activated, and the other resources are inactivated. Then, as the channel switching is repeated, all the resources corresponding to the broadcast signal, which has ever been processed in the display apparatus, are activated. In this state, a system load may exceed an allowable limit for a normal operation in accordance with the specifications of the display apparatuses 100. If the system load exceeds the allowable limit for the normal operation, the excessive system load may cause the display apparatus 100 to have low performance.

Below, a third exemplary embodiment improved in this regard will be described.

Figure 14:
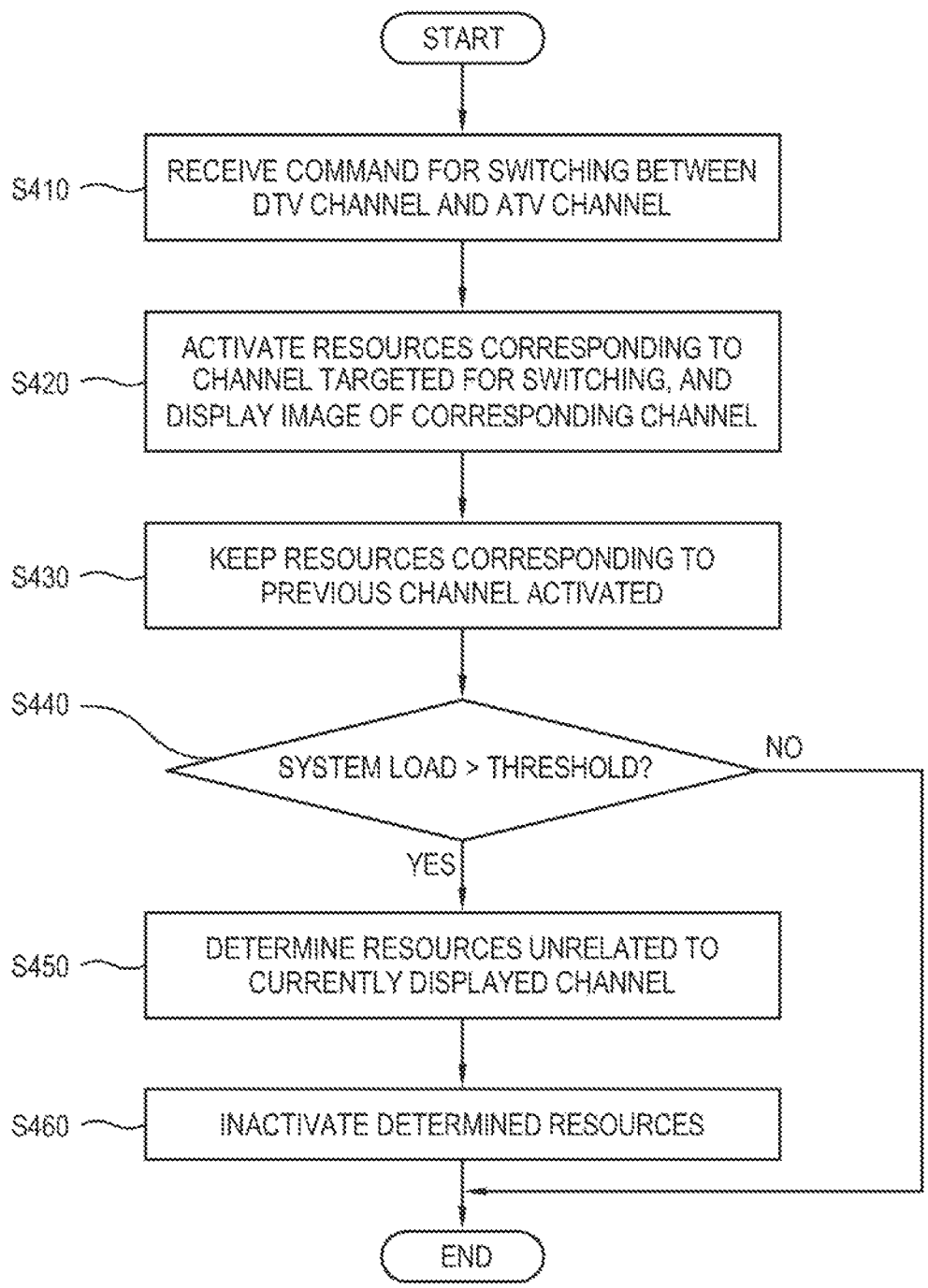
FIG. 14 is a flowchart that a display apparatus according to a third exemplary embodiment inactivates the resources in accordance with a system load.

FIG. 14 is a flowchart that a display apparatus according to a third exemplary embodiment inactivates the resources in accordance with a system load.

As shown in FIG. 14, at operation S410, the display apparatus according to the third exemplary embodiment receives a command for switching between the DTV channel and the ATV channel. For example, the display apparatus may receive the command for switching over to the ATV channel while the current DTV channel image is displayed.

At operation S420, the display apparatus activates the resources corresponding to the channels targeted for switching in response to the command for the channel switching, and displays an image of the corresponding channel. For example, the display apparatus activates the resources corresponding to the ATV channel and displays the ATV channel image.

At operation S430, the display apparatus keeps the activation state of the resources corresponding to the previous channel. For example, the display apparatus keeps the resources corresponding to the DTV channel activated.

At operation S440, the display apparatus determines whether its system load exceeds a preset threshold.

If it is determined that the system load exceeds the preset threshold, at operation S450 the display apparatus determines what resources do not correspond to the currently displayed channel. If the currently displayed channel is the ATV channel, the resources corresponding to the DTV channel are determined as resources that do not correspond to the channel.

At operation S460, the display apparatus inactivates the determined resources.

On the other hand, it is determined that the system load does not exceed the preset threshold, the display apparatus keeps the current states.

Like this, if the system load of the display apparatus exceeds the threshold, the display apparatus lowers the system load by inactivating the resources unnecessary for processing the video signal of the currently displayed channel, thereby guaranteeing the normal operations. If the system load does not exceed the threshold, the display apparatus keeps the activation states of the resources unnecessary for processing the video signal of the currently displayed channel, thereby guaranteeing a quick switching operation when the channel is switched in the future.

To determine whether the system load exceeds the threshold, there are various ways. To determine the system load, the display apparatus may for example determine whether its energy consumption level exceeds a preset threshold, or determine whether the number of currently activated unit resources exceeds a preset threshold.

In the foregoing exemplary embodiments, the display apparatus inactivates the resources that do not correspond to the currently displayed channel. However, the display apparatus may not inactivate these resources at once, but may inactivate individual resources in sequence in accordance with the current states.

FIG. 15 illustrates a list 310 of resources to be sequentially inactivated by a display apparatus according to a fourth exemplary embodiment if a system load is high.

As shown in FIG. 15, the display apparatus according to the fourth exemplary embodiment may for example store a list 310 to designate which resource will be preferentially inactivated among the resources prepared for processing the DTV signal. Such a list 310 may be created when the display apparatus is manufactured, provided by a server or the like external device to the display apparatus through a network, or input by a user through a user interface (UI).

If it is determined at operation 440 that the level of the system load exceeds the threshold as described in FIG. 14, the display apparatus does not inactivate all the resources unnecessary for the channel, but inactivates the resources having the highest priority among the resources designated in the list 310. After that, if it is determined that the level of the system load still exceeds the threshold, the display apparatus inactivates the resources having the next highest priority in the list 310. The display apparatus repeats this operation until the level of the system load does not exceed the threshold.

For example, if it is determined the level of the system load exceeds the threshold while the ATV channel image is currently displayed, the display apparatus makes a call for the list 310 and selects the resources having the highest priority of inactivation among the resources corresponding to the DTV channel in the list 310. In this list 310, the resource having the highest priority corresponds to the DTV decoder. Thus, the display apparatus inactivates the DTV decoder and determines whether the system load exceeds the threshold.

If the system load does not exceed the threshold, the display apparatus keeps the current state.

On the other hand, if the system load exceeds the threshold, the display apparatus inactivates the demultiplexer having the next highest priority of the DTV decoder in the list 310, and determines again whether the system load exceeds the threshold.

Like this, if the resources are selectively inactivated in accordance with the priorities of the list 310, it is possible to reduce the number of resources, which have to be activated when the channel is switched in the future, more than that of when all the resources are wholly inactivated, thereby minimizing the delay in the channel switching.

Figure 16:
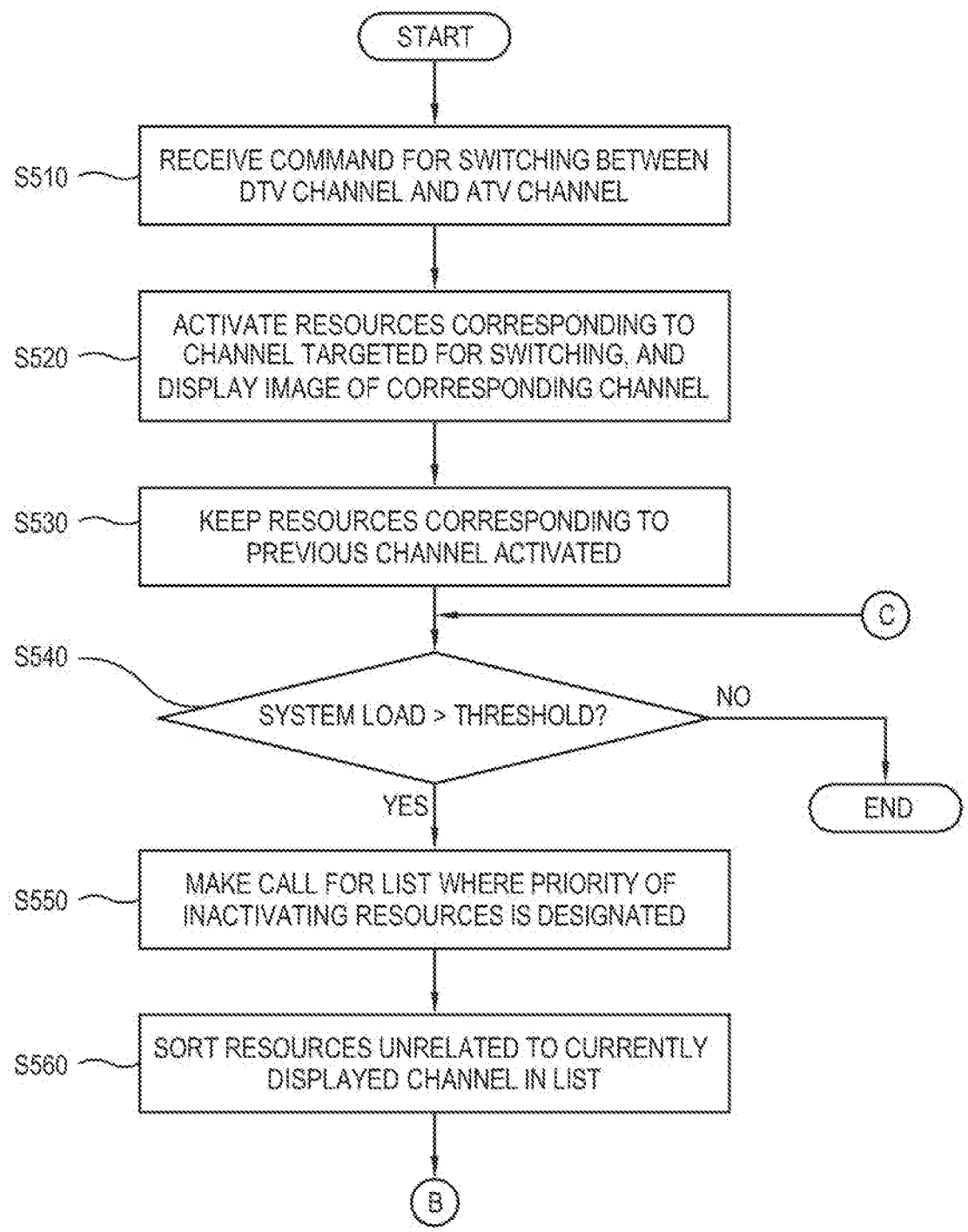
FIG. 16 and FIG. 17 are flowcharts that a display apparatus according to a fourth exemplary embodiment selectively inactivates resources in accordance with a system load.
Figure 17:
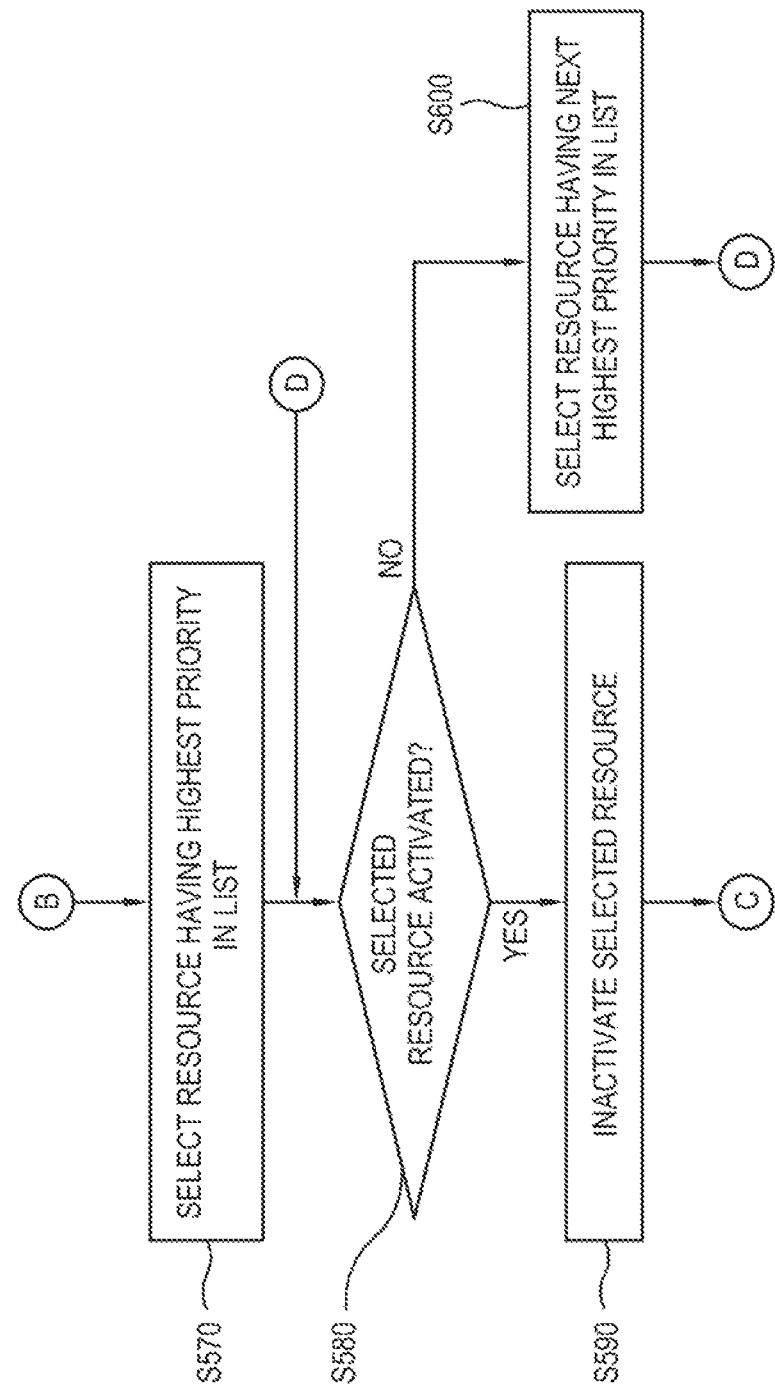

FIG. 16 and FIG. 17 are flowcharts that a display apparatus according to a fourth exemplary embodiment selectively inactivates resources in accordance with a system load.

As shown in FIG. 16, at operation S510, the display apparatus receives a command for switching between the DTV channel and the ATV channel. For example, the display apparatus may receive a command for switching over to the ATV channel, which is issued by a user, while the DTV channel image is currently displayed.

At operation S520, the display apparatus activates the resources corresponding to the channel targeted for switching in response to the command for the channel switching, and displays an image of the corresponding channel. For example, the display apparatus activates the resources corresponding to the ATV channel and displays the ATV channel image.

At operation S530, the display apparatus keeps the activation states of the resources corresponding to the previous channel. For example, the display apparatus keeps the activation states of the resources corresponding to the DTV channel.

At operation S540, the display apparatus determines whether the level of the system load exceeds the preset threshold.

If it is determined that the level of the system load does not exceed the preset threshold, the display apparatus keeps the current states.

On the other hand, if the level of the system load exceeds the preset threshold, at operation S550 the display apparatus makes a call for the list where the priorities of resource inactivation are set.

At operation S560, the display apparatus sorts the resources, which do not correspond to the currently displayed channel, in the list. For example, if the display apparatus is currently displaying the ATV channel image, the resources corresponding to the DTV channel are sorted in the list.

As shown in FIG. 17, at operation S570, the display apparatus selects the resource having the highest priority in the list. For example, the display apparatus selects the resource having the highest priority among the resources corresponding to the DTV channel recorded in the list. For instance, if the resource having the highest priority in the list is the DTV decoder, the display apparatus selects the DTV decoder.

At operation S580, the display apparatus determines whether the selected resource is activated or not. For example, the display apparatus determines whether the DTV decoder is currently activated or not.

If it is determined that the selected resource is activated, at operation S590 the display apparatus inactivates the corresponding resource. For example, if the DTV decoder is currently activated, the display apparatus inactivates the DTV decoder. Then, the display apparatus returns to the operation S540 of FIG. 16, and repeats the operations of selecting and inactivating the resources until the system load does not exceed the threshold.

On the other hand, if it is determined that the selected resource is not activated, i.e. inactivated, at operation S600 the display apparatus selects the resource having the next highest priority in the list and returns to the operation S580. For example, if the DTV decoder has already been inactivated, the display apparatus selects the demultiplexer next to the DTV decoder in the list.

In the foregoing exemplary embodiments, the display apparatus selectively inactivates the resources to reduce the system load.

In this exemplary embodiment, the display apparatus inactivates the resources, which do not correspond to the currently displayed channel, if it is determined that the system load is high. However, the inventive concept may be achieved differently from the foregoing embodiment.

Figure 18:
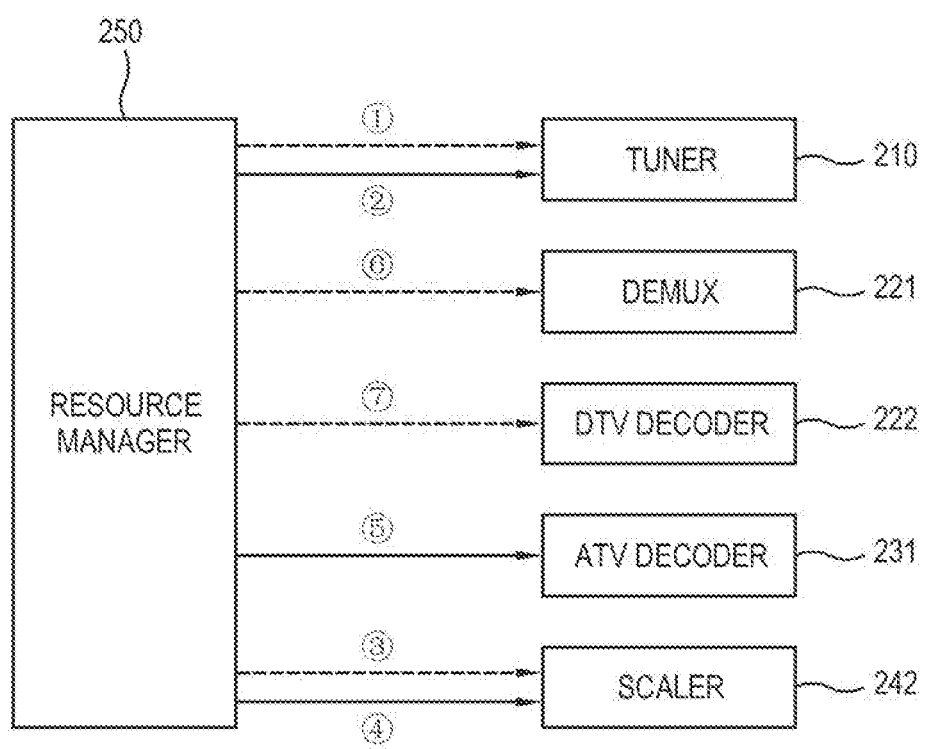
FIG. 18 illustrates a sequence of activating and inactivating resources in response to that a display apparatus according to a fifth exemplary embodiment switches over from a DTV channel to an ATV channel.

FIG. 18 illustrates a sequence of activating and inactivating resources in response to that a display apparatus 100 according to a fifth exemplary embodiment switches over from a DTV channel to an ATV channel.

As shown in FIG. 18, the resource manager 250 of the display apparatus 100 according to the fifth exemplary embodiment controls the tuner 210, the demultiplexer 221, the DTV decoder 222, the ATV decoder 231 and the scaler 242 to be activated and inactivated. The tuner 210 and the scaler 242, i.e. the resources employed in common for processing the DTV channel and the ATV channel, are needed to be reset when the channel is switched. The resources used only in processing the DTV channel include the demultiplexer 221 and the DTV decoder 222, and the resources used only in processing the ATV channel include the ATV decoder 231.

In this embodiment, the resource manager 250 performs a first operation of resetting the resources used in common for processing the DTV channel and the ATV channel in response to a command for switching over from the DTV channel to the ATV channel, and a second operation of activating the resources used in processing the ATV channel. The second operation may be performed before the first operation, or may be performed after the first operation.

The resource manager 250 performs a third operation of inactivating the resources used in processing the DTV channel after the ATV channel image is displayed as the first operation and the second operation are completed.

For example, the tuner 210, the demultiplexer 221, the DTV decoder 222 and the scaler 242 are being currently activated to display the DTV channel image, but the ATV decoder 231 is being inactivated.

If the resource manager 250 receives a command for switching over to the ATV channel while the DTV channel image is being displayed, the resource manager 250 resets the tuner 210 by inactivating the tuner 210 and then activating the tuner 210 again. Further, the resource manager 250 inactivates the scaler 242 and then activates the scaler 242 again to reset the scaler 242. Further, the resource manager 250 activates the ATV decoder 231 to display the ATV channel image. In FIG. 18, the dotted arrow refers to the operation of inactivating the resources, and the solid arrow refers to the operation of activating the resources.

Next, the resource manager 250 inactivates the demultiplexer 221 and the DTV decoder 222 as the switch-over to the ATV channel is completed.

Figure 19:
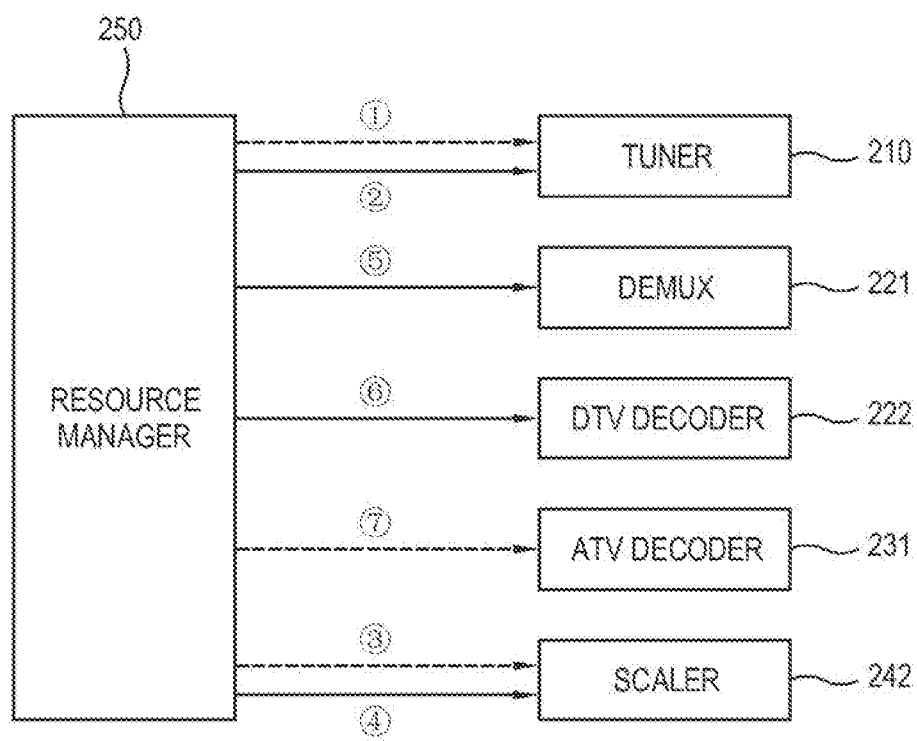
FIG. 19 illustrates a sequence of activating and inactivating resources in response to that the display apparatus according to the fifth exemplary embodiment switches over from an ATV channel to a DTV channel.

FIG. 19 illustrates a sequence of activating and inactivating resources in response to that the display apparatus 100 according to the fifth exemplary embodiment switches over from an ATV channel to a DTV channel.

As shown in FIG. 19, the resource manager 250 resets the tuner 210 by inactivating the tuner 210 and then activating the tuner 210 again if receiving a command for switching over to the DTV channel while the ATV channel image is being displayed. In addition, the resource manager 250 inactivates the scaler 242 and then activates the scaler 242 again to reset the scaler 242. Further, the resource manager 250 activates the demultiplexer 221 and the DTV decoder 222 to display the DTV channel image. In FIG. 19, the dotted arrow refers to the operation of inactivating the resources, and the solid arrow refers to the operation of activating the resources.

Next, the resource manager 250 inactivates the ATV decoder 231 as the switch-over to the DTV channel is completed.

As shown in FIG. 18 and FIG. 19, in response to a command for switching over from a first channel of one between the DTV and the ATV to a second channel of the other between the DTV and the ATV, the display apparatus 100 in this embodiment preferentially resets and activates the resources corresponding to the second channel to display an image of the second channel, and then inactivates the resources unnecessary for the second channel after the switch-over to the second channel is completed as the image of the second channel is displayed. Thus, the display apparatus minimizes the delay in channel switching between the DTV and the ATV.

Figure 20:
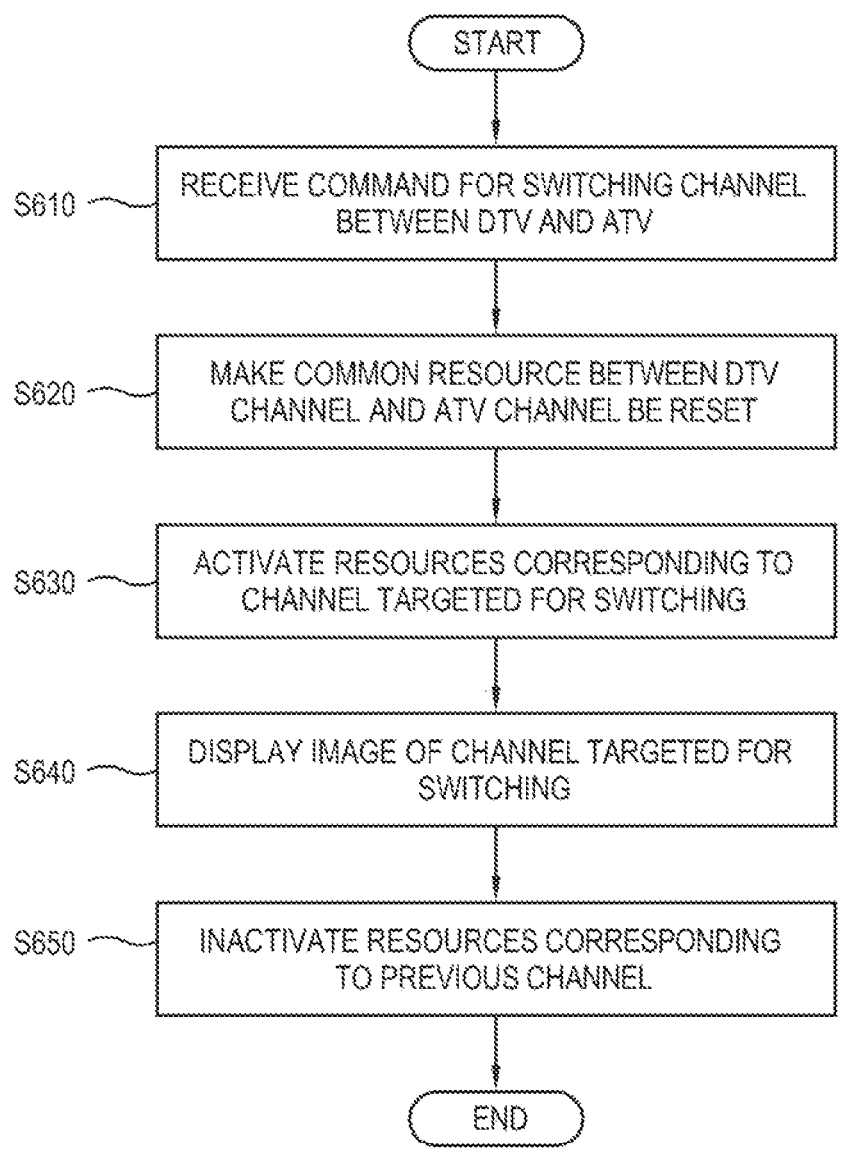
FIG. 20 is a flowchart that the display apparatus according to the fifth exemplary embodiment switches between a DTV channel and an ATV channel.

FIG. 20 is a flowchart that the display apparatus according to the fifth exemplary embodiment switches between a DTV channel and an ATV channel.

As shown in FIG. 20, at operation S610 the display apparatus receives a command for switching between the DTV channel and the ATV channel. For example, the display apparatus receives a command for switching over to the ATV channel while the DTV channel image is being displayed.

At operation S620, the display apparatus resets the common resources between the DTV channel and the ATV channel in response to the command for the channel switching. For example, the display apparatus resets the tuner and the scaler, which are used in common for processing the DTV channel and the ATV channel, to correspond to the ATV channel.

At operation S630, the display apparatus activates the resources corresponding to the channel targeted for switching. For example, the display apparatus activates the ATV decoder used in processing the ATV channel.

At operation S640, the display apparatus displays an image of the channel targeted for switching. For example, the display apparatus displays the ATV channel image by switching over from the DTV channel to the ATV channel.

At operation S650, the display apparatus inactivates the resources corresponding to the previous channel. For example, the display apparatus inactivates the demultiplexer and the DTV decoder that have been used in processing the DTV channel.

In the foregoing exemplary embodiment, the display apparatus may include one tuner, one demultiplexer, one scaler, etc. Alternatively, the display apparatus may have various internal structures, and the inventive concept may be applied to the display apparatus having various structures.

Figure 21:
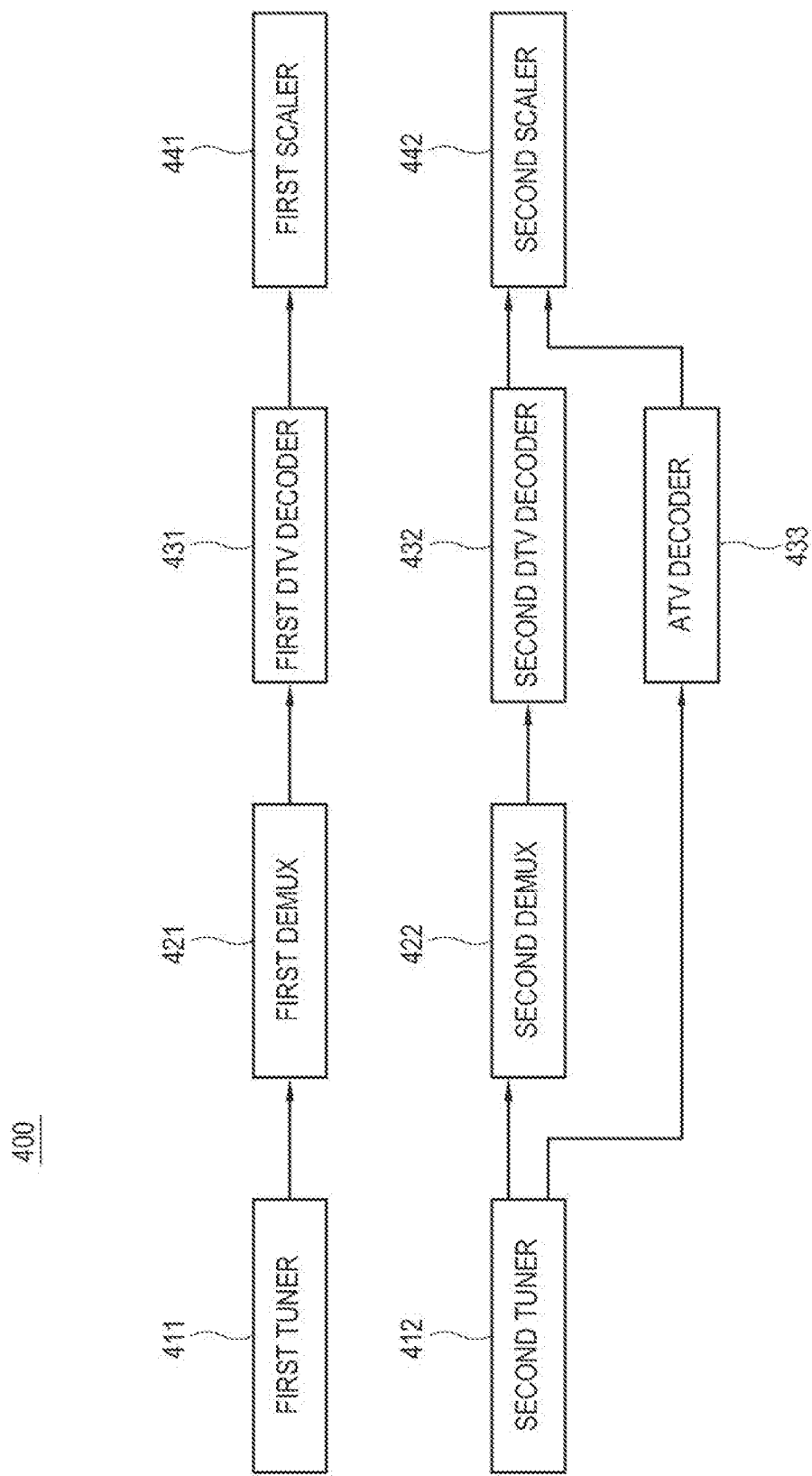
FIG. 21 is a block diagram of a signal processor in a display apparatus according to a sixth exemplary embodiment.

FIG. 21 is a block diagram of a signal processor 400 in a display apparatus according to a sixth exemplary embodiment.

As shown in FIG. 21, in the display apparatus according to the sixth exemplary embodiment, a signal processor 400 may include a first tuner 411, a second tuner 412, a first demultiplexer 421, a second demultiplexer 422, a first DTV decoder 431, a second DTV decoder 432, an ATV decoder 433, a first scaler 441, and a second scaler 442. The functions of these elements are substantially the same as those of the tuner, the demultiplexer, the DTV decoder, the ATV decoder and the scaler disclosed in the foregoing exemplary embodiment, and therefore detailed descriptions thereof will be omitted.

In this embodiment, the signal processor 400 may include two DTV signal processors for processing the DTV signal. The first DTV signal processor may include the first tuner 411, the first demultiplexer 421, the first DTV decoder 431 and the first scaler 441. Further, the second DTV signal processor may include the second tuner 412, the second demultiplexer 422, the second DTV decoder 432 and the second scaler 442. There are many reasons why two DTV signal processors are provided. For example, two DTV signal processors may be needed for the purpose of achieving a picture-in-picture function. That is, the first DTV signal processor may be used in displaying an image for a main screen of the PIP, and the second DTV signal processor may be used in displaying an image for a sub screen in the PIP.

As the elements for processing an ATV signal, there are the second tuner 412, the ATV decoder 433, and the second scaler 442. The second tuner 412 receives an ATV signal, the ATV decoder 433 decodes the ATV signal, and the second scaler 442 applies scaling to the ATV signal.

The signal processor 400 uses the first tuner 411, the first demultiplexer 421, the first DTV decoder 431 and the first scaler 441 to display the DTV channel image. Further, the signal processor 400 uses the second tuner 412, the ATV decoder 433 and the second scaler 442 to display the ATV channel image. Like this, in this embodiment, there are no common resources between the resources for displaying the DTV channel image and the resources for displaying the ATV channel image.

Thus, the signal processor 400 in this embodiment may perform the following operations.

Figure 22:
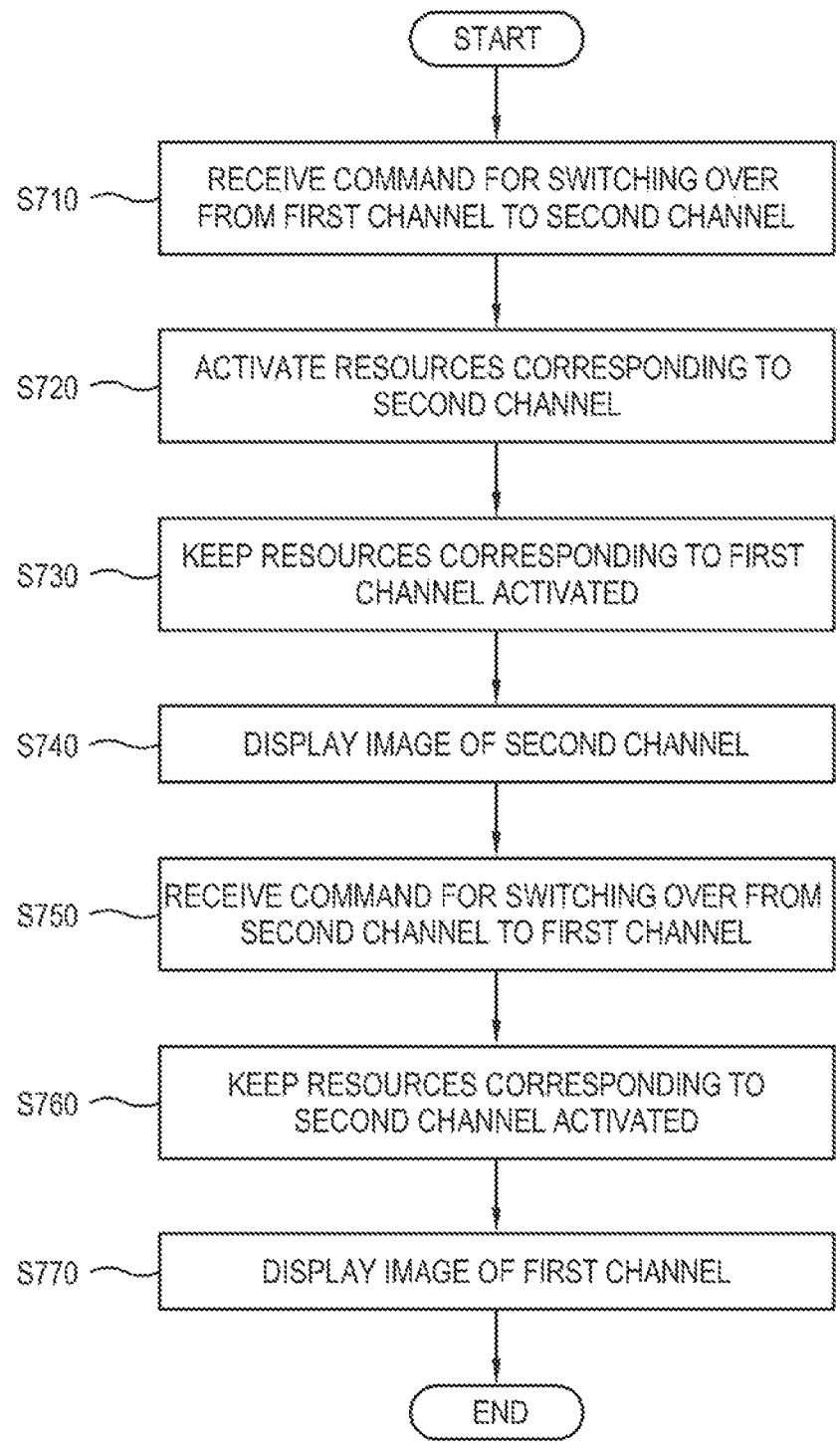
FIG. 22 is a flowchart that the display apparatus according to the sixth exemplary embodiment switches a channel over in response to a command for switching between a DTV channel and an ATV channel.

FIG. 22 is a flowchart that the display apparatus according to the sixth exemplary embodiment switches a channel over in response to a command for switching between a DTV channel and an ATV channel.

As shown in FIG. 22, at operation S710 the display apparatus receives a command for switching over from a first channel of one between the DTV channel and the ATV channel to a second channel of the other one between the DTV channel and the ATV channel. If the first channel is the DTV channel, the second channel is the ATV channel. On the other hand, if the first channel is the ATV channel, the second channel is the DTV channel. For example, the display apparatus may receive a command for switching over to the ATV channel while the DTV channel is being displayed.

At operation S720, the display apparatus activates the resources corresponding to the second channel in response to the command for switching the channel. For example, the display apparatus activates the second tuner, the ATV decoder and the second scaler to process the ATV channel.

At operation S730, the display apparatus keeps the activation states of the resources corresponding to the first channel. For example, the display apparatus keeps the activation states of the first tuner, the first demultiplexer, the first DTV decoder and the first scaler for processing the DTV channel.

At operation S740, the display apparatus displays an image of the second channel. For example, the display apparatus uses the activated second tuner, ATV decoder and second scaler to display the ATV channel image.

At operation S750, the display apparatus receives a command for switching over from the second channel to the first channel. For example, the display apparatus receives a command for switching over to the DTV channel while the ATV channel image is being displayed.

At operation S760, the display apparatus keeps the activation states of the resources corresponding to the second channel. For example, the display apparatus keeps the activation states of the second tuner, the ATV decoder and the second scaler to process the ATV channel.

At operation S770, the display apparatus displays an image of the first channel in response to the command for switching the channel. Since the resources for processing the DTV channel have been already activated in the operation S730, the display apparatus display the DTV channel image with the minimum delay.

Thus, the display apparatus keeps the activation states of the resources corresponding to the previous channel even though the channel is switched between the DTV channel and the ATV channel, and thus more quickly switch the channel when the channel is required to be switched. Further, if it is determined that the system load is excessive due to the activation of the resources, the display apparatus may selectively inactivates the resources which are not currently in use. In this regard, the foregoing exemplary embodiments are applicable, and thus repetitive descriptions will be avoided.

Alternatively, another method different from that of the foregoing embodiment may be applicable to the display apparatus. This alternatively method will be described below.

Figure 23:
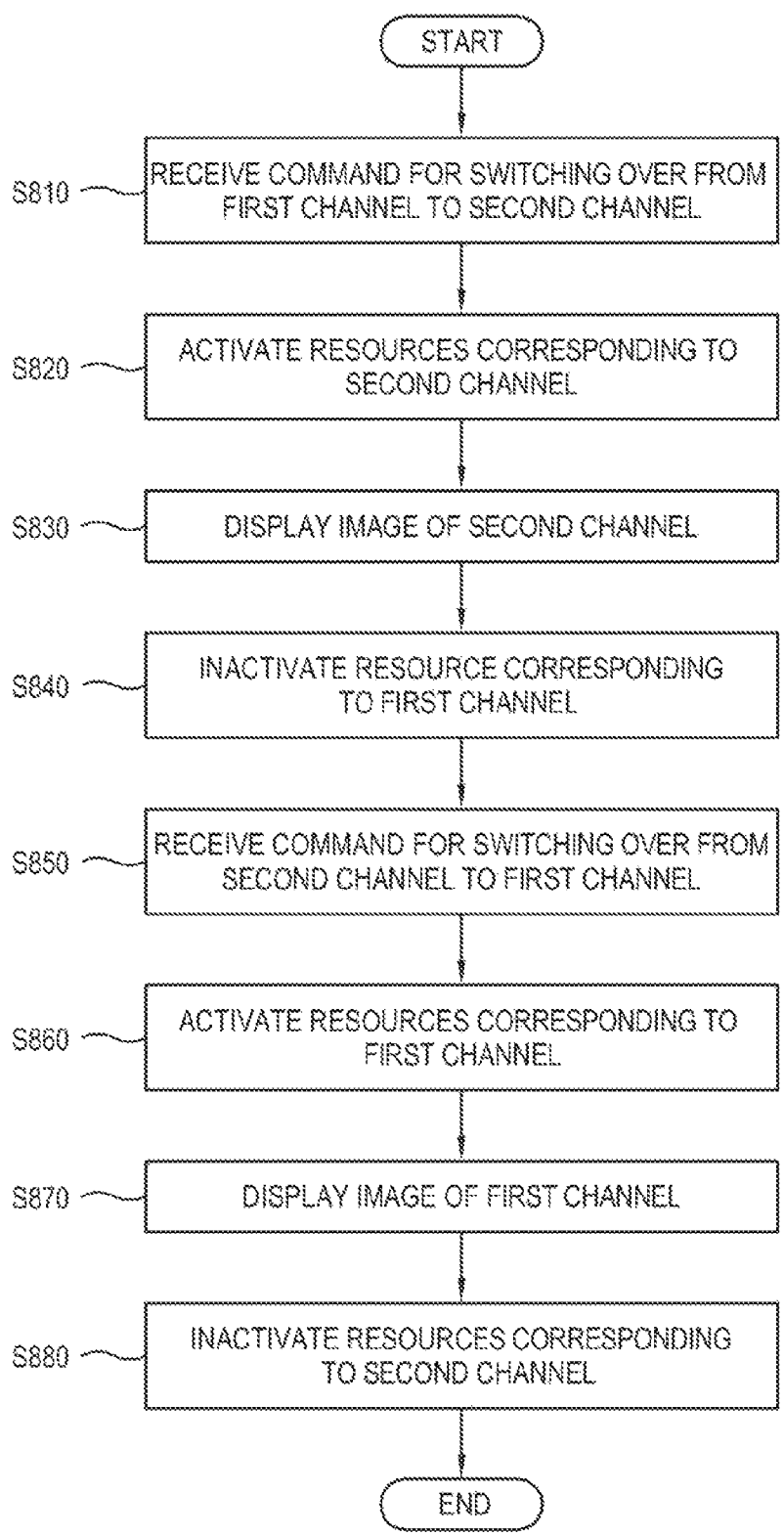
FIG. 23 is a flowchart that a display apparatus according to a seventh exemplary embodiment switches a channel over in response to a command for switching between a DTV channel and an ATV channel.

FIG. 23 is a flowchart that a display apparatus according to a seventh exemplary embodiment switches a channel over in response to a command for switching between a DTV channel and an ATV channel.

As shown in FIG. 23, at operation S810, the display apparatus according to the seventh exemplary embodiment receives a command for switching over from a first channel of one between the DTV channel and the ATV channel to a second channel of the other between the DTV channel and the ATV channel. For example, the display apparatus receives a command for switching over to the ATV channel while the DTV channel is being displayed.

At operation S820, the display apparatus activates the resources corresponding to the second channel in response to the command for switching the channel. For example, the display apparatus activates the second tuner, the ATV decoder and the second scaler to process the ATV channel.

At operation S830, the display apparatus displays an image of the second channel. For example, the display apparatus uses the activated second tuner, ATV decoder and second scaler to display an ATV channel image.

At operation S840, the display apparatus inactivates the resources corresponding to the first channel. For example, the display apparatus inactivates the first tuner, the first demultiplexer, the first DTV decoder and the first scaler to process the DTV channel.

At operation S850, the display apparatus receives a command for switching over from the second channel to the first channel. For example, the display apparatus receives a command for switching over to the DTV channel while the ATV channel image is being displayed.

At operation S860, the display apparatus activates the resources corresponding to the first channel in response to the command for switching the channel. The display apparatus activates the first tuner, the first demultiplexer, the first DTV decoder and the first scaler to process the DTV channel.

At operation S870, the display apparatus displays an image of the first channel. For example, the display apparatus employs the activated first tuner, first demultiplexer, first DTV decoder and first scaler to display the DTV channel image.

At operation S880, the display apparatus inactivates the resources corresponding to the second channel. For example, the display apparatus inactivates the second tuner, the ATV decoder, the second scaler to process the ATV channel.

Like this, the display apparatus first activates the resources the channel targeted for switching to display an image of the targeted channel, and then inactivates the resources unnecessary for the corresponding channel. Therefore, it is possible to not only quickly switch the channel but also reduce energy consumption since the resources not in current use are inactivated.

The methods according to the foregoing exemplary embodiments may be achieved in the form of a program command that can be implemented in various computers, and recorded in a computer readable medium. Such a computer readable medium may include a program command, a data file, a data structure or the like, or combination thereof. For example, the computer readable medium may be stored in a voltage or nonvolatile storage such as a read only memory (ROM) or the like, regardless of whether it is deletable or rewritable, for example, a RAM, a memory chip, a device or integrated circuit (IC) like memory, or an optically or magnetically recordable or machine (e.g., a computer)-readable storage medium, for example, a compact disk (CD), a digital versatile disk (DVD), a magnetic disk, a magnetic tape or the like. It will be appreciated that a memory, which can be included in a mobile terminal, is an example of the machine-readable storage medium suitable for storing a program having instructions for realizing the exemplary embodiments. The program command recorded in this storage medium may be specially designed and configured according to the exemplary embodiments, or may be publicly known and available to those skilled in the art of computer software.

Although exemplary embodiments have been shown and described, it will be appreciated by those skilled in the art that changes may be made to these exemplary embodiments without departing from the principles and spirit of the disclosure, the scope of which is defined in the appended claims and their equivalents.

What is claimed is:

1. A display apparatus, comprising:
   a display;
   at least one first processing module configured for processing both a first broadcast signal and a second broadcast signal in common;
   at least one second processing module configured for processing either the first broadcast signal or the second broadcast signal; and
   a controller configured, in response to receiving a first command for switching over from a first broadcast channel corresponding to the first broadcast signal to a second broadcast channel corresponding to the second broadcast signal, to reset the at least one first processing module to process the second broadcast signal, and to keep the at least one second processing module in an activation state.

2. The display apparatus according to claim 1, wherein the controller is configured to keep the at least one second processing module activated to display an image of the second broadcast channel on the display in response to the first command, and is configured to keep the at least one first processing module activated while the image of the second broadcast channel is being displayed.

3. The display apparatus according to claim 2, wherein the controller is configured to inactivate one of the at least one first processing module and the at least one second processing module, which is not currently used in processing a broadcast signal, if a level of a system load exceeds a preset threshold.

4. The display apparatus according to claim 3, further comprising a storage configured to store information about a sequence of inactivating one or more of the at least one first processing module and one or more of the at least one second processing module, wherein the controller is configured to inactivate one or more of the at least one first processing module or one or more of the at least one second processing module in sequence until the level of the system load does not exceed the preset threshold, based on the information stored in the storage.

5. The display apparatus according to claim 2, wherein the controller is configured to use the activated at least one first processing module to display an image of a third broadcast channel in response to a second command for switching over from the second broadcast channel corresponding to the second broadcast signal to the third broadcast channel corresponding to the first broadcast signal, and keeps the at least one second processing module activated while the image of the third broadcast channel is being displayed.

6. The display apparatus according to claim 1, wherein the controller is configured to reset the at least one first processing module by providing the at least one first processing module with channel information prepared to be referred to when the second broadcast signal is processed.

7. The display apparatus according to claim 6, wherein the controller extracts the channel information from the second broadcast signal.

8. The display apparatus according to claim 1, wherein one of the first broadcast signal and the second broadcast signal comprises a digital broadcast signal, and the other one of the first broadcast signal and the second broadcast signal comprises an analog broadcast signal.

9. The display apparatus according to claim 1, wherein in response to receiving a second command for switching over from the second broadcast channel to the first broadcast channel, the controller is configured to process the first broadcast signal corresponding to the first broadcast channel using the at least one second processing module of which the activation state is kept while the second broadcast signal is processed without the at least one second processing module.

10. A method of controlling a display apparatus having at least one first processing module configured for processing both a first broadcast signal and a second broadcast signal in common, and at least one second processing module configured for processing either the first broadcast signal or the second broadcast signal, the method comprising:
    displaying a first image based on a first broadcast channel corresponding to the first broadcast signal;
    receiving first command to switch over from the first broadcast channel corresponding to the first broadcast signal to a second broadcast channel corresponding to the second broadcast signal; and
    in response to receiving the first command, resetting the at least one first processing module to process the second broadcast signal, and keeping the at least one second processing module in an activation state.

11. The method according to claim 10, further comprising, in response to receiving the first command, displaying a second image based on the second broadcast channel corresponding to the second broadcast signal,
    wherein displaying the second image comprises:
        activating the at least one second processing module to display the image of the second broadcast channel; and
        keeping the at least one first processing module activated while the image of the second broadcast channel is being displayed.

12. The method according to claim 11, further comprising:

determining whether a level of a system load exceeds a preset threshold; and inactivating one of the at least one first processing module and the at least one second processing module, which is not currently used in processing a broadcast signal, if it is determined that the level of the system load exceeds the preset threshold.

13. The method according to claim 12, wherein the inactivating the one of the at least one first processing module and the at least one second processing module, which is not currently used in processing the broadcast signal, comprises:

inactivating one or more of the at least one first processing module or one or more of the at least one second processing module in sequence until the level of the system load does not exceed the preset threshold, based on information about a sequence of inactivating one or more of the at least one first processing module and one or more of the at least one first processing module.

14. The method according to claim 11, wherein the resetting comprises:

resetting the at least one first processing module by providing the at least one first processing module with channel information prepared to be referred to when the second broadcast signal is processed.

15. The method according to claim 14, wherein the channel information is extracted from the second broadcast signal.

16. The method according to claim 11, wherein the displaying the second image comprises:

using the activated at least one first processing module to display an image of a third broadcast channel in response to a second command for switching over from the second broadcast channel corresponding to the second broadcast signal to the third broadcast channel corresponding to the first broadcast signal; and keeping the at least one second processing module activated while the image of the third broadcast channel is being displayed.

17. The method according to claim 10, wherein one of the first broadcast signal and the second broadcast signal comprises a digital broadcast signal, and the other one of the first broadcast signal and the second broadcast signal comprises an analog broadcast signal.

* * * * *